(12) United States Patent
Mojdeh et al.

(10) Patent No.: US 11,511,485 B2
(45) Date of Patent: Nov. 29, 2022

(54) 3D PRINTED OBJECTS WITH SELECTIVE OVERCURE REGIONS

(71) Applicant: Align Technology, Inc., San Jose, CA (US)

(72) Inventors: Mehdi Mojdeh, Fremont, CA (US); Brett E. Kelly, Oakland, CA (US); Shiva P. Sambu, Milpitas, CA (US)

(73) Assignee: Align Technology, Inc., San Jose, CA (US)

( * ) Notice: Subject to any disclaimer, the term of this patent is extended or adjusted under 35 U.S.C. 154(b) by 56 days.

(21) Appl. No.: 16/837,978

(22) Filed: Apr. 1, 2020

(65) Prior Publication Data

US 2020/0316856 A1  Oct. 8, 2020

Related U.S. Application Data

(60) Provisional application No. 62/828,163, filed on Apr. 2, 2019.

(51) Int. Cl.
| | |
|---|---|
| *B29C 64/188* | (2017.01) |
| *B29C 64/245* | (2017.01) |
| *B29C 64/35* | (2017.01) |
| *B29C 64/40* | (2017.01) |
| *B29C 71/04* | (2006.01) |
| *B29C 64/393* | (2017.01) |

(Continued)

(52) U.S. Cl.
CPC .......... *B29C 64/188* (2017.08); *B29C 64/245* (2017.08); *B29C 64/35* (2017.08); *B29C 64/393* (2017.08); *B29C 64/40* (2017.08); *B29C 71/04* (2013.01); *B29L 2031/753* (2013.01); *B33Y 10/00* (2014.12); *B33Y 40/20* (2020.01); *B33Y 50/02* (2014.12); *B33Y 80/00* (2014.12)

(58) Field of Classification Search
CPC ....... B29C 71/04; B29C 64/40; B29C 64/393; B29C 64/129; B29C 64/35; B29C 64/245; B29C 64/188; A61C 7/08; B33Y 40/20; B33Y 80/00; B33Y 50/02; B33Y 10/00; B29L 2031/753
See application file for complete search history.

(56) References Cited

U.S. PATENT DOCUMENTS

| | | |
|---|---|---|
| 6,749,414 B1 | 6/2004 | Hanson et al. |
| 7,192,273 B2 | 3/2007 | McSurdy, Jr. |

(Continued)

FOREIGN PATENT DOCUMENTS

| | | |
|---|---|---|
| EP | 3085519 A1 | 10/2016 |
| WO | 9959030 A2 | 11/1999 |

*Primary Examiner* — Monica A Huson
*Assistant Examiner* — Kelsey C Grace
(74) *Attorney, Agent, or Firm* — Lowenstein Sandler LLP

(57) ABSTRACT

A method of manufacturing a three-dimensional (3D) object may include fabricating a support structure and fabricating the 3D object on the support structure, wherein the support structure contacts the 3D object at a support region of the 3D object. The method further includes overcuring the 3D object at an overcure region of the 3D object, wherein the overcure region is distinct from the support region, and removing the support structure from the 3D object. After removal of the support structure, a support mark remains on the 3D printed object where the support structure had contacted the 3D object, wherein the overcure region of the 3D object projects past the support mark.

18 Claims, 20 Drawing Sheets

(51) Int. Cl.
   *B33Y 50/02*   (2015.01)
   *B33Y 10/00*   (2015.01)
   *B33Y 80/00*   (2015.01)
   *B29L 31/00*   (2006.01)
   *B33Y 40/20*   (2020.01)

(56) References Cited

U.S. PATENT DOCUMENTS

| | | |
|---|---|---|
| 7,874,836 B2 | 1/2011 | McSurdy, Jr. |
| 7,892,474 B2 | 2/2011 | Shkolnik et al. |
| 8,776,391 B1 | 7/2014 | Kaza et al. |
| 9,610,141 B2 | 4/2017 | Kopelman et al. |
| 9,844,424 B2 | 12/2017 | Wu et al. |
| 9,943,386 B2 | 4/2018 | Webber et al. |
| 9,943,991 B2 | 4/2018 | Tanugula et al. |
| 10,213,277 B2 | 2/2019 | Webber et al. |
| 10,363,116 B2 | 7/2019 | Boronkay |
| 2014/0061974 A1 | 3/2014 | Tyler |
| 2014/0265034 A1 | 9/2014 | Dudley |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0238280 A1 | 8/2015 | Wu et al. |
| 2015/0367415 A1* | 12/2015 | Buller ............... C22C 38/02 419/53 |
| 2016/0310236 A1 | 10/2016 | Kopelman et al. |
| 2016/0311024 A1 | 10/2016 | Thiel |
| 2017/0007359 A1 | 1/2017 | Kopelman et al. |
| 2017/0007360 A1 | 1/2017 | Kopelman et al. |
| 2017/0007362 A1 | 1/2017 | Chen et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0129188 A1* | 5/2017 | Dufort ............... H05B 6/80 |
| 2017/0165032 A1 | 6/2017 | Webber et al. |
| 2018/0086004 A1 | 3/2018 | Van Espen |
| 2019/0298494 A1 | 10/2019 | Webber et al. |
| 2019/0338067 A1 | 11/2019 | Liska et al. |
| 2019/0345276 A1 | 11/2019 | Liska et al. |

* cited by examiner

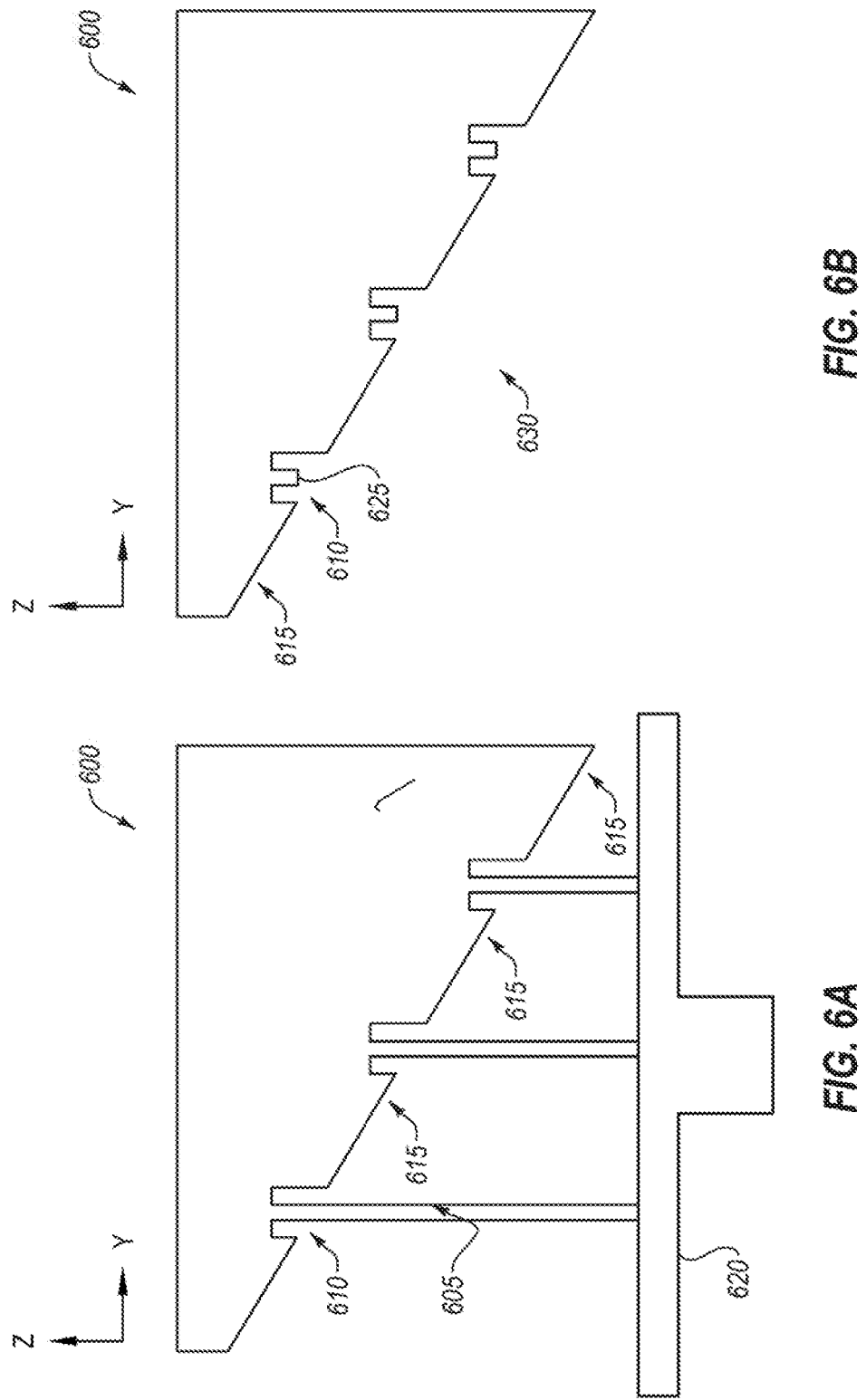

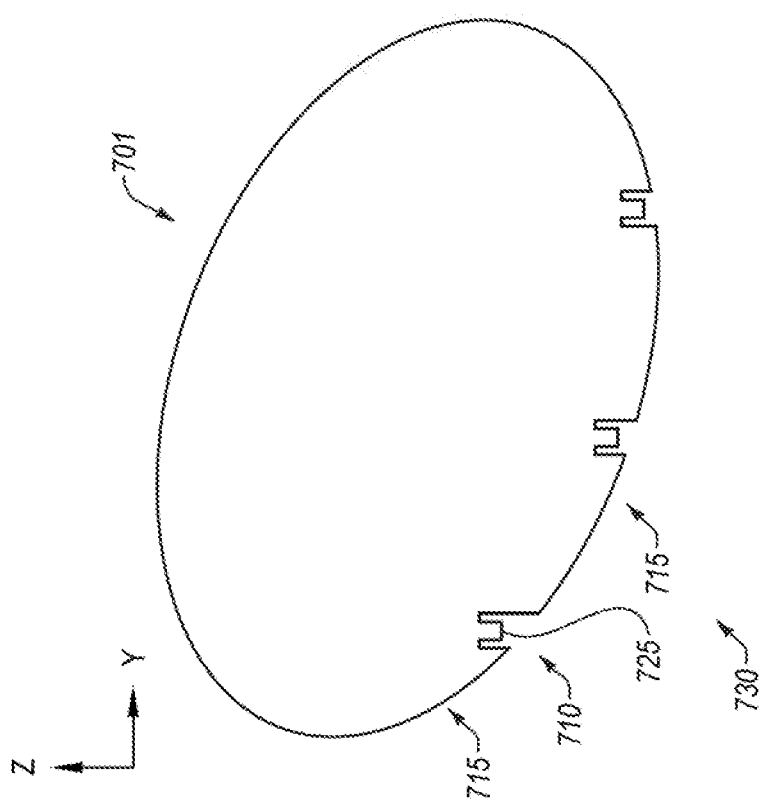
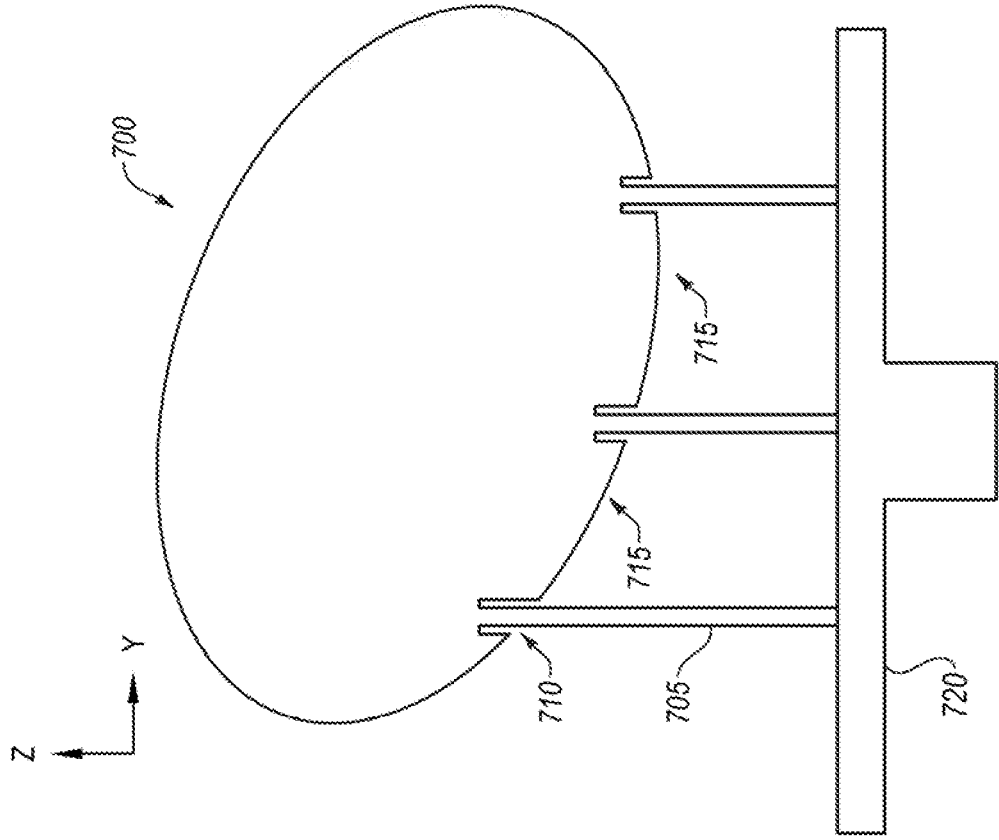
FIG. 7A
FIG. 7B

950

```
┌─────────────────────────────────────────────────────────────┐
│ Apply a first orthodontic appliance to a patient's teeth to │
│ reposition the teeth from a first tooth arrangement to a    │
│ second tooth arrangement 960                                │
└─────────────────────────────────────────────────────────────┘
                              │
                              ▼
┌─────────────────────────────────────────────────────────────┐
│ Apply a second orthodontic appliance to the patient's teeth │
│ to reposition the teeth from the second tooth arrangement   │
│ to a third tooth arrangement 970                            │
└─────────────────────────────────────────────────────────────┘
```

```
┌─────────────────────────────────────────────────────────────┐
│ Determine a movement path to move one or more teeth from    │
│ an initial arrangement to a target arrangement              │
│ 1010                                                        │
└─────────────────────────────────────────────────────────────┘
                              │
                              ▼
┌─────────────────────────────────────────────────────────────┐
│ Determine a force system to produce movement of the one or  │
│ more teeth along the movement path                          │
│ 1020                                                        │
└─────────────────────────────────────────────────────────────┘
                              │
                              ▼
┌─────────────────────────────────────────────────────────────┐
│ Determine an arch or palate expander design for an          │
│ orthodontic appliance configured to produce the force system│
│ 1030                                                        │
└─────────────────────────────────────────────────────────────┘
                              │
                              ▼
┌─────────────────────────────────────────────────────────────┐
│ Determine instructions for fabrication of the orthodontic   │
│ appliance (or mold that will be used to manufacture         │
│ orthodontic appliance), optionally incorporating the arch   │
│ or palate expander design 1040                              │
└─────────────────────────────────────────────────────────────┘
```

Gather a virtual representation of a three-dimensional (3D) object to be fabricated in an additive manufacturing process, the 3D object having a surface with an intended surface profile
1302

↓

Identify, on the virtual representation, one or more support structures to be formed in the additive manufacturing process, the one or more support structures residing on the surface of the 3D object, the one or more support structures configured to support the 3D object on a build platform, and the one or more support structures to be removed
1304

↓

Identify, on the virtual representation, one or more support marks to remain on the surface of the 3D object after removal of the support structures
1306

↓

Identify one or more overcure regions on the surface of the 3D object, the one or more overcure regions configured to recess the support marks from the surface to cause the surface to conform to the intended surface profile 1308

↓

Provide instructions to fabricate the 3D object with the overcure regions according to the additive manufacturing process 1310

↓

Fabricate the 3D object with the overcure regions according to the additive manufacturing process 1312

FIG. 13

3D PRINTED OBJECTS WITH SELECTIVE OVERCURE REGIONS

RELATED APPLICATIONS

This patent application claims the benefit under 35 U.S.C. § 119(e) of U.S. Provisional Application No. 62/828,163, filed Apr. 2, 2019, which is herein incorporated by reference.

TECHNICAL FIELD

Embodiments of the present disclosure relate to the field of rapid prototyping of objects and, in particular, to an object formed using a rapid prototyping technique, where the object is formed with overcure regions near sacrificial support structures that, when the sacrificial support structures are removed from the object, limit the support marks remaining from the sacrificial support structures on one or more surfaces of the object.

BACKGROUND

In conventional stereolithography (SLA) systems, sacrificial support structures (also referred to simply as support structures) are used to attach three-dimensional (3D) printed parts to a movable build platform (also referred to simply as a platform). The sacrificial support structures hold the 3D printed object (also referred to as a 3D object, printed 3D object, printed object, or simply object) during the printing process. The use of sacrificial support structures corrects for any misalignment between the movable build platform and a surface of a vat of photocurable resin. Additionally, the sacrificial support structures secure the printed object and maintain the printed object at a known fixed height and position relative to the build platform and/or relative to the surface of the photocurable resin. Additionally, the sacrificial support structures enable the 3D printed object to be easily removed from the build platform after the 3D printed object is complete. Regardless of orientation, support structures are generally needed to start printing a part and to support the part and any overhanging features during the printing process.

After printing of a 3D printed object is complete, the support structures are removed from the 3D printed object (e.g., by breaking or cutting the support structures). Removal of the support structures from the 3D printed object generally leaves behind support structure marks (also referred to herein simply as support marks), which are remnants of the sacrificial support structures that protrude from the 3D printed object at the locations where the support structures joined the 3D printed object. Support marks are often rough, with unpredictable length, height and/or surface pattern. The support marks that are left behind after the sacrificial support structures are removed can cause a bottom surface of the 3D printed object (e.g., surface closest to the build platform) to become non-flat or otherwise deviate from a target bottom surface profile.

In conventional SLA manufacturing processes, the support marks are then sanded to remove the support marks from the bottom surface of the printed object. However, the sanding process is imprecise and can sand off too much material, which can also result in the bottom surface of the printed object becoming non-flat or otherwise deviating from the target bottom surface profile. Additionally, the sanding process can be a time consuming process, which is often performed manually.

Additionally, for some objects with complex geometries it can be difficult or impossible to completely remove support structures generated during the additive manufacturing process. This can render such objects unusable for their intended purpose in some situations.

SUMMARY

In a first aspect of the disclosure, a method of manufacturing a three-dimensional (3D) object comprises fabricating a support structure (e.g., using an additive manufacturing process); fabricating the 3D object on the support structure (e.g., using the additive manufacturing process), wherein the support structure contacts the 3D object at a support region of the 3D object; overcuring the 3D object at an overcure region of the 3D object, wherein the overcure region is distinct from the support region; and removing the support structure from the 3D object, wherein after removal of the support structure, a support mark remains on the 3D printed object where the support structure had contacted the 3D object, wherein the overcure region of the 3D object projects past the support mark.

A second aspect of the disclosure may extend the first aspect of the disclosure. In the second aspect of the disclosure, the support region comprises a cavity in a surface of the 3D object, wherein the support mark is within the cavity. A third aspect of the disclosure may extend the first or second aspect of the disclosure. In the third aspect of the disclosure, the method further comprises fabricating a plurality of support structures, wherein the support structure is one of the plurality of support structures, and wherein the 3D object is supported by the plurality of support structures during fabrication of the 3D object; and removing the plurality of support structures from the 3D object, wherein support marks remain on the 3D printed object where each of the plurality of support structures had contacted the 3D object, and wherein the overcure region of the 3D object projects past the support marks.

A fourth aspect of the disclosure may extend any of the first through third aspects of the disclosure. In the fourth aspect of the disclosure, a bottom surface of the 3D object that comprises the overcure region is substantially flat such that a top surface of the 3D object is at a known position relative to a flat surface on which the 3D object is placed after removal of the support structure. A fifth aspect of the disclosure may extend any of the first through fourth aspects of the disclosure. In the fifth aspect of the disclosure, a surface of the 3D object has a specified profile with specified design tolerances, and wherein the support marks do not interfere with the specified design tolerances. A sixth aspect of the disclosure may extend any of the first through fifth aspects of the disclosure. In the sixth aspect of the disclosure, a first horizontal cross section of the support region is larger than a second horizontal cross section of the support structure to provide a separation between the support structure and the overcure region.

A seventh aspect of the disclosure may extend any of the first through sixth aspects of the disclosure. In the seventh aspect of the disclosure, the overcure region defines an outer profile of the 3D object, wherein the support mark does not extend outside of the outer profile defined by the overcure region. An eighth aspect of the disclosure may extend the seventh aspect of the disclosure. In the eighth aspect of the disclosure, the support mark is rough, and wherein the outer profile of the 3D object that corresponds to the overcure region is substantially smooth.

A ninth aspect of the disclosure may extend any of the first through eighth aspects of the disclosure. In the ninth aspect of the disclosure, the 3D object is fabricated by a rapid prototyping machine based on computer readable instructions representing a virtual 3D model of the 3D object, wherein an outermost edge of the 3D object corresponds to the overcure region and is specified in the computer readable instructions. A tenth aspect of the disclosure may extend any of the first through ninth aspects of the disclosure. In the tenth aspect of the disclosure, one end of the support structure is attached to the build platform, wherein the support structure comprises one or more angled struts that are angled relative to gravity, and wherein the support structure is configured to break at a location that is inset from an outermost edge of the 3D object. An eleventh aspect of the disclosure may extend any of the first through tenth aspects of the disclosure. In the eleventh aspect of the disclosure, the additive manufacturing process is performed in a stepwise manner, wherein a different layer of the 3D object is fabricated at each step, and wherein the overcuring is performed at one or more predetermined layers of the overcure region.

A $12^{th}$ aspect of the disclosure may extend any of the first through $11^{th}$ aspects of the disclosure. In the $12^{th}$ aspect of the disclosure, the 3D object comprises a positive mold of a dental arch of a patient that is used to thermoform a removable customized dental appliance comprising a plurality of tooth receiving cavities, and wherein the overcure region provides a flat bottom surface for the mold of the dental arch that is operatively unaffected by the support mark. A $13^{th}$ aspect of the disclosure may extend any of the first through $12^{th}$ aspects of the disclosure. In the $13^{th}$ aspect of the disclosure, the method further comprises performing the following after fabricating the 3D object and before removing the support structures from the 3D object: cleaning the 3D object; and performing post-curing of the 3D object.

A $14^{th}$ aspect of the disclosure may extend any of the first through $13^{th}$ aspects of the disclosure. In the $14^{th}$ aspect of the disclosure, an outer profile of the 3D object defined by the overcure region is at least one of substantially level, substantially even, substantially straight or substantially curved. A $15^{th}$ aspect of the disclosure may extend any of the first through $14^{th}$ aspects of the disclosure. In the $15^{th}$ aspect of the disclosure, the 3D object is a multi-layer object; fabricating the support structure and fabricating the 3D object each comprise selectively curing a photocurable polymer at specified locations using a first exposure time and a first energy level that are selected to cure a first thickness of the photocurable polymer corresponding to a layer; and overcuring the 3D object comprises curing the photocurable polymer at the overcure region using a second exposure time and a second energy level that are selected to cure a second thickness of the photocurable polymer that is greater than the first thickness, wherein at least one of the second exposure time is greater than the first exposure time or the second energy level is greater than the first energy level.

A $16^{th}$ aspect of the disclosure comprises a method of manufacturing a three-dimensional (3D) object, the method comprising: curing a photocurable polymer at n layers to form a support structure for the 3D object using an additive manufacturing process; curing the photocurable polymer at layer n+1 at a support region of the 3D object, wherein at least a portion of the support region of the 3D object contacts the support structure; and overcuring the photocurable polymer at layer n+1 at an overcure region of the 3D object that is distinct from the support region such that a bottom of the overcure region extends beyond the layer n+1.

A $17^{th}$ aspect of the disclosure may extend the $16^{th}$ aspect of the disclosure. In the $17^{th}$ aspect of the disclosure, the overcuring is performed such that the overcure region extends below layer n and/or below layer n−1. An $18^{th}$ aspect of the disclosure may extend the $17^{th}$ aspect of the disclosure. In the $18^{th}$ aspect of the disclosure, the curing is performed using a first exposure time and a first energy level that are selected to cure a first thickness of the photocurable polymer corresponding to a layer; and the overcuring is performed using at least one of a second exposure time or a second energy level that are selected to cure a second thickness of the photocurable polymer that is greater than the first thickness, wherein at least one of the second exposure time is greater than the first exposure time or the second energy level is greater than the first energy level.

A $19^{th}$ aspect of the disclosure includes a three-dimensional (3D) object comprising: a plurality of layers representative of an additive manufacturing process, wherein each layer of the plurality of layers approximately has a first thickness; a first layer of the plurality of layers that forms at least a portion of a first surface of the 3D object, the first layer comprising a support region and an overcure region, wherein the first layer approximately has the first thickness at the support region and a greater second thickness at the overcure region; and a support mark at the support region, wherein the support mark is inset from a first surface profile of the 3D object defined by the overcure region.

A $20^{th}$ aspect of the disclosure may extend the $19^{th}$ aspect of the disclosure. In the $20^{th}$ aspect of the disclosure, the overcure region defines a lip on the first surface, wherein the support mark is horizontally inset from the lip defined by the overcure region. A $21^{st}$ aspect of the disclosure may extend the $20^{th}$ aspect of the disclosure. In the $21^{st}$ aspect of the disclosure, the lip is a continuous surface edge of the 3D object. A $22^{nd}$ aspect of the disclosure may extend any of the $19^{th}$ through $21^{st}$ aspects of the disclosure. In the $22^{nd}$ aspect of the disclosure, the first layer is a bottom layer and the first surface is a bottom surface of the 3D object. A $23^{rd}$ aspect of the disclosure may extend any of the $19^{th}$ through $22^{nd}$ aspects of the disclosure. In the $23^{rd}$ aspect of the disclosure, the support mark has been formed by removing a support structure from the 3D object, wherein the support structure supported the 3D object during the additive manufacturing process.

A $24^{th}$ aspect of the disclosure may extend any of the $19^{th}$ through $23^{rd}$ aspects of the disclosure. In the $24^{th}$ aspect of the disclosure, a first horizontal cross section of the support region is greater than a second horizontal cross section of the support mark. A $25^{th}$ aspect of the disclosure may extend any of the $19^{th}$ through $24^{th}$ aspects of the disclosure. In the $25^{th}$ aspect of the disclosure, the support region comprises a cavity in the first surface of the 3D object, wherein the support mark is within the cavity. A $26^{th}$ aspect of the disclosure may extend any of the $19^{th}$ through $25^{th}$ aspects of the disclosure. In the $26^{th}$ aspect of the disclosure, the 3D object further comprises a plurality of support regions, each of the plurality of support regions comprising at least one support mark, wherein each support mark is tangentially inset from the first surface profile of the 3D object defined by the overcure region.

A $27^{th}$ aspect of the disclosure may extend any of the $19^{th}$ through $26^{th}$ aspects of the disclosure. In the $27^{th}$ aspect of the disclosure, the first surface of the 3D object that comprises the overcure region is substantially flat such that an opposing surface of the 3D object is at a known position relative to a flat surface on which the 3D object is placed. A 28$^{th}$ aspect of the disclosure may extend any of the 19$^{th}$ through 27$^{th}$ aspects of the disclosure. In the 28$^{th}$ aspect of the disclosure, the first surface profile is a specified profile with specified design tolerances, and wherein the support mark does not interfere with the specified design tolerances. A 29$^{th}$ aspect of the disclosure may extend any of the 19$^{th}$ through 28$^{th}$ aspects of the disclosure. In the 29$^{th}$ aspect of the disclosure, the support mark is rough, and wherein the first surface profile of the 3D object that corresponds to the overcure region is substantially smooth.

A 30$^{th}$ aspect of the disclosure may extend any of the 19$^{th}$ through 29$^{th}$ aspects of the disclosure. In the 30$^{th}$ aspect of the disclosure, the 3D object comprises a positive mold of a dental arch of a patient that is configured to thermoform a removable customized dental appliance comprising a plurality of tooth receiving cavities, and wherein the overcure region provides a flat bottom surface for the mold of the dental arch that is unaffected by the support mark. A 31$^{st}$ aspect of the disclosure may extend any of the 19$^{th}$ through 30$^{th}$ aspects of the disclosure. In the 31$^{st}$ aspect of the disclosure, the first surface profile of the 3D object defined by the overcure region is at least one of substantially level, substantially even, substantially straight or substantially curved. A 32$^{nd}$ aspect of the disclosure may extend any of the 19$^{th}$ through 31$^{st}$ aspects of the disclosure. In the 32$^{nd}$ aspect of the disclosure, the support mark is approximately tangentially inset from the first surface profile of the 3D object defined by the overcure region. A 33$^{rd}$ aspect of the disclosure may extend any of the 19$^{th}$ through 32$^{nd}$ aspects of the disclosure. In the 33$^{rd}$ aspect of the disclosure, the 3D object is used to thermoform an aligner without smoothing the surface of the 3D object.

A 34$^{th}$ aspect of the disclosure includes a method comprising: gathering a virtual representation of a three-dimensional (3D) object to be fabricated in an additive manufacturing process, the 3D object having a surface with an intended surface profile; identifying on the virtual representation one or more support structures to be formed in the additive manufacturing process, the one or more support structures residing on the surface of the 3D object, the one or more support structures configured to support the 3D object on a build platform, and the one or more support structures to be removed from the 3D object; identifying on the virtual representation one or more support marks to remain on the surface of the 3D object after removal of the support structures; identifying one or more overcure regions on the surface of the 3D object, the one or more overcure regions configured to recess the support marks from the surface to cause the surface to conform to the intended surface profile; and providing instructions to fabricate the 3D object with the overcure regions according to the additive manufacturing process.

A 35$^{th}$ aspect of the disclosure may extend the 34$^{th}$ aspect of the disclosure. In the 35$^{th}$ aspect of the disclosure, the 3D object is a dental appliance mold. A 36$^{th}$ aspect of the disclosure may extend the 34$^{th}$ or 35$^{th}$ aspect of the disclosure. In the 36$^{th}$ aspect of the disclosure, the one or more overcure regions form one or more indentations to recess the support marks into the 3D object relative to the surface. A 37$^{th}$ aspect of the disclosure may extend any of the 34$^{th}$ through 36$^{th}$ aspects of the disclosure. In the 37$^{th}$ aspect of the disclosure, the one or more overcure regions form a lip to recess the support marks into the 3D object relative to the surface. A 38$^{th}$ aspect of the disclosure may extend any of the 34$^{th}$ through 37$^{th}$ aspects of the disclosure. In the 38$^{th}$ aspect of the disclosure, the method further comprises fabricating the 3D object with the overcure regions according to the additive manufacturing process. A 39$^{th}$ aspect of the disclosure may extend any of the 34$^{th}$ through 38$^{th}$ aspects of the disclosure. In the 39$^{th}$ aspect of the disclosure, identifying on the virtual representation one or more support marks comprises identifying one or more support regions containing the one or more support marks.

A 40$^{th}$ aspect of the disclosure is a three-dimensional object comprising: at least one surface having an intended surface profile; one or more support regions coupled to the at least one surface, each of the one or more support regions comprising one or more support marks, each of the one or more support marks comprising a remaining portion of corresponding one or more sacrificial support structures partially removed from the one or more support regions; and one or more overcure regions coupled to the at least one surface, the one or more overcure regions distinct from the one or more support regions, the one or more overcure regions forming one or more overcure shapes to recess the one or more support marks of the one or more support regions from the surface to cause the surface to conform to the intended surface profile.

A 41$^{st}$ aspect of the disclosure may further extend the 40$^{th}$ aspect of the disclosure. In the 41$^{st}$ aspect of the disclosure, the 3D object comprises a thermoforming mold. A 42$^{nd}$ aspect of the disclosure may extend the 40$^{th}$ or 41$^{st}$ aspect of the disclosure. In the 42$^{nd}$ aspect of the disclosure, the thermoforming mold is used to form polymeric dental appliances. A 43$^{rd}$ aspect of the disclosure may extend any of the 40$^{th}$ through 42$^{nd}$ aspects of the disclosure. In the 43$^{rd}$ aspect of the disclosure, the thermoforming mold comprises one of a plurality of thermoforming molds, the plurality of thermoforming molds used to thermoform a corresponding plurality of aligners to move a patient's teeth from an initial position toward an intended position.

A 44$^{th}$ aspect of the disclosure is a three-dimensional (3D) object, comprising: at least one surface having an intended surface profile; one or more support regions coupled to the at least one surface, each of the one or more support regions comprising one or more support marks, each of the one or more support marks comprising a remaining portion of corresponding one or more sacrificial support structures partially removed from the one or more support regions; and means for recessing the one or more support marks of the one or more support regions from the surface to cause the surface to conform to the intended surface profile.

BRIEF DESCRIPTION OF THE DRAWINGS

The present disclosure is illustrated by way of example, and not by way of limitation, in the figures of the accompanying drawings.

FIG. 6A illustrates an example printed 3D object with overcure regions and support regions, in accordance with one embodiment.

FIG. 6B illustrates the example printed 3D object of FIG. 6A with recessed support marks that remain after removal of the support structures from the 3D object, in accordance with one embodiment.

FIG. 7A illustrates an example printed 3D object with overcure regions and support regions, in accordance with one embodiment.

FIG. 7B illustrates the example printed 3D object of FIG. 7A with recessed support marks that remain after removal of the support structures from the 3D object, in accordance with one embodiment.

FIG. 9 illustrates a method of orthodontic treatment using a plurality of appliances, in accordance with embodiments.

FIG. 10 illustrates a method for designing an orthodontic appliance.

FIG. 13 illustrates an example of a method for gathering a virtual representation if a three-dimensional (3D) object to be fabricated in an additive manufacturing process.

DETAILED DESCRIPTION

Described herein is a new technique of manufacturing three-dimensional (3D) objects using a manufacturing process such as an additive manufacturing process (e.g., stereolithography (SLA)) as well as 3D objects manufactured using the new technique. A "3D object" as used herein, may include any physical material or thing, including parts, components, integrated systems, etc. Some examples of a 3D object used herein is a 3D printed orthodontic aligner (or other dental appliance) and a 3D printed mold used in the fabrication of dental appliances, such as polymeric aligners. "Additive manufacturing," as used herein, may include one or more processes in which material is joined or solidified under computer control to create a 3D object, with material being added together (such as liquid molecules or powder grains being fused together), typically layer by layer. Additive manufacturing may include 3D printing as described further herein.

Figure 1:
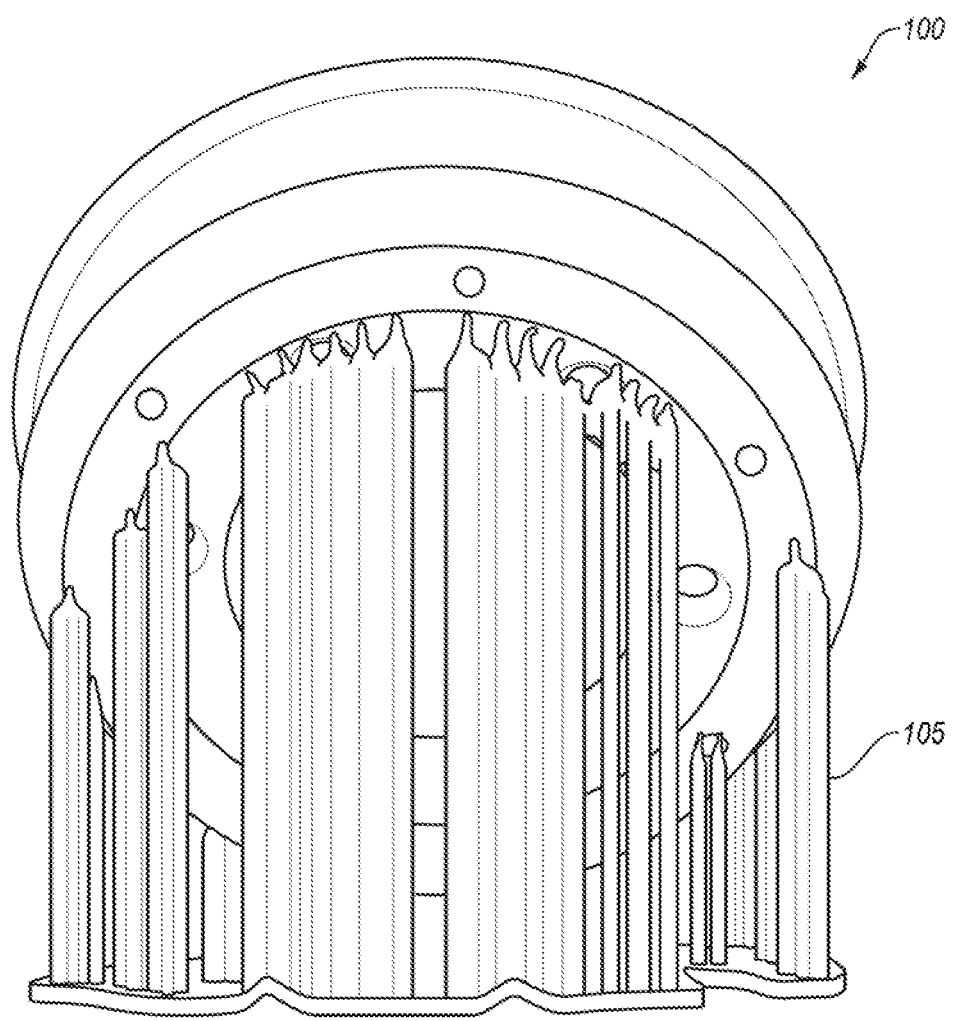
FIG. 1 illustrates an example of a 3D printed object with support structures.

FIG. 1 illustrates an example printed 3D object 100 with support structures 105. The support structures 105 may be configured to hold the 3D printed object 100 at a precise location to ensure that some or all details of the 3D printed object 100: 1) were attached to the support structure and were formed accurately; 2) resist lateral pressure from a resin-filled blade; 3) are not affected by deflection due to gravity; and/or 5) retain newly created sections during peel or other processes.

After printing of a 3D object has been printed, the support structures are then typically removed, leaving behind support marks, which, as used herein, may refer to remnants of the sacrificial support structures that remain part of an object that is printed using the sacrificial support structures. Support marks may be rough, have unpredictable length(s), height(s) and/or surface pattern(s), protrude from a 3D printed object at the locations where their respective support structures joined to the 3D printed object, etc. Support marks left behind removal of sacrificial support structures can cause a surface of the 3D printed object to deviate from a target surface profile. For example, in circumstances where it is desirable for a surface of a 3D printed object to have a flat profile, the existence of support marks on the surface may cause bumps and/or other patterns that result in a surface profile that is bumpy, choppy, etc.

Additionally, some 3D printed objects have design tolerances for an external surface and/or profile of the 3D printed objects. For example, a mold of a dental arch used for thermoforming of dental appliances (e.g., polymeric orthodontic aligners) may have design tolerances for the flatness of the bottom surface of the mold. The bottom surface of the mold be designed to be flat, and may or may not be designed to be level. The support marks often cause 3D printed molds to deviate from the design tolerances. For example, the support marks may cause the molds to have non-flat bottoms, which can interfere with the thermoforming process and/or other processes performed after thermoforming, such as cutting of the thermoformed dental appliance at a margin line. In another example, 3D printed objects may be designed to mate with other surfaces, and may need to have an outer profile (e.g., a side profile, top profile, bottom profile, etc.) within design tolerances. Deviation from the design tolerances may cause the 3D printed object to fail to mate properly with another object and/or surface. The target profile for the printed object may be a flat profile, a curved profile, a profile having a particular geometric shape, a level profile, and so on. Sanding or smoothing processes are often ineffective to remove support marks, particularly in some contexts. In conventional SLA manufacturing processes and other additive manufacturing processes, for instance, the smoothing process is often imprecise and can remove too much material, which can also result in the surface of the printed object that included the support marks deviating from the target surface profile. Smoothing process(es) can also cause the bottom of a mold of a dental arch or surface of another 3D part to deviate from design tolerances and can interfere with thermoforming and/or other processes. Additionally, smoothing process(es) can be a time consuming process. Accordingly, sanding the support marks to remove them from the 3D printed object can increase the cost of the object and increase a time to manufacture the 3D printed object.

In embodiments, an additive manufacturing process includes one or more overcure operations to generate an overcure region (or multiple overcure regions) that extends beyond or past support marks that remain after support structures are removed from a printed 3D object. An "overcure region," as used herein, may include one or more regions on a 3D object that are subject to an extra amount of curing radiation (e.g., additional exposure time and/or additional radiation energy) compared to other regions of the 3D object. As noted herein, an overcure region may result in a surface geometry that is different than the surface geometry of other regions. As examples, overcure regions may be characterized by a surface geometry that defines lip(s), the boundaries of indentation(s), overhang(s), and/or other surface structures that are different than other (e.g. non-overcured) regions. An "overcure operation," as used herein, may include one or more operations that result in overcure regions. Examples of overcure operations include process operations where exposure time(s) and/or energ(ies) of curing radiation are increased relative to other (e.g. non-overcure) regions. An overcure region may allow a 3D printed object to conform to a target surface profile (e.g., a side view profile, front view profile, back view profile, etc.) without the need for sanding or other smoothing operations. A target surface profile may be an outline of a surface of the 3D object as viewed from a particular side and/or angle. As an example, an overcure region may allow a 3D object to have a surface with a substantially smooth surface profile within one or more design tolerances.

Embodiments discussed herein cause support marks to be recessed within overcure regions of 3D printed objects. For instance, in some embodiments, the outer profile of a 3D printed object (e.g., within the bottommost edge or surface of the 3D printed object) such that the support marks do not interfere with a functionality of the 3D printed object and do not cause the 3D printed object to deviate from design tolerances. Accordingly, embodiments discussed herein can ensure one or more surfaces of 3D printed objects (e.g., those that are connected to support structures) conform to their intended profiles. As a result, the support marks can be left on the 3D printed object and traditional smoothing operations can be eliminated. Accordingly, embodiments discussed herein can also reduce the manufacturing time and cost of 3D printed objects manufactured using additive manufacturing processes.

In one embodiment, a method of manufacturing a three-dimensional (3D) object includes fabricating a support structure (e.g., using an additive manufacturing process), fabricating the 3D object on the support structure (e.g., using the additive manufacturing process), and overcuring the 3D object at an overcure region of the 3D object. The support structure contacts the 3D object at a support region of the 3D object, and the overcure region is distinct from the support region. The method further includes removing the support structure from the 3D object. After removal of the support structure, a support mark remains on the 3D printed object where the support structure had contacted the 3D object, wherein the overcure region of the 3D object projects past the support mark.

In one embodiment, a method of manufacturing a three-dimensional (3D) object includes curing a photocurable polymer at n layers to form a support structure for the 3D object using an additive manufacturing process. The method further includes curing the photocurable polymer at layer n+1 at a support region of the 3D object, wherein at least a portion of the support region of the 3D object contacts the support structure. The method further includes overcuring the photocurable polymer at layer n+1 at an overcure region of the 3D object that is distinct from the support region such that a bottom of the overcure region extends below the layer n+1.

In one embodiment, a three-dimensional (3D) object is manufactured by an additive manufacturing process. The 3D object includes a plurality of layers representative of the additive manufacturing process, wherein each layer of the plurality of layers approximately has a first thickness. The 3D object further includes a first layer of the plurality of layers that forms at least a portion of a first surface of the 3D object, the first layer comprising a support region and an overcure region, wherein the first layer approximately has the first thickness at the support region and a greater second thickness at the overcure region. The 3D object further includes a support mark at the support region, wherein the support mark is inset from a first surface profile of the 3D object defined by the overcure region.

Some embodiments are discussed herein with reference to molds of dental arches that may be used for the forming of dental appliances (e.g., orthodontic aligners) over such molds. Such molds may be unique positive molds of a patient's dental arch at a particular stage in orthodontic treatment. However, it should be understood that embodiments discussed herein are applicable to any 3D object manufactured using an additive manufacturing process. For example, embodiments are applicable to dental appliances (e.g., orthodontic aligners) directly manufactured via an additive manufacturing process (e.g., directly 3D printed). Some example 3D objects can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds." These patents/applications are hereby incorporated by reference as if set forth fully herein.

In some embodiments, the techniques set forth herein can be used to form appliances with mandibular repositioning features. Examples of these can be found in: U.S. Pat. No. 9,844,424 by inventors Wu et al., entitled "Dental appliance with repositioning jaw elements;" U.S. Pat. Pub. No. 2015/0238280 by inventors Wu et al., entitled "Dental appliance with repositioning jaw elements;" and U.S. Pat. No. 10,213,277 by inventors Webber et al., entitled "Dental appliance binding structure." These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" and U.S. Pat. No. 7,874,836 by inventor McSurdy entitled "System and method for palatal expansion." These patents/applications are hereby incorporated by reference as if set forth fully herein.

In some embodiments, the techniques herein can be used to form attachment formation templates. Examples can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" and U.S. patent application Ser. No. 16/366,686 by inventors Webber et al., entitled "Dental attachment placement structure." These patents/applications are hereby incorporated by reference as if set forth fully herein.

In some embodiments, the techniques herein can be used to form directly fabricated aligners. Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App. Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopeleman et al., entitled "Direct fabrication of aligners for arch expansion;" and U.S. Pat. App. Pub. No. 2017/0007367 to Li et al., entitled "Direct fabrication of palate expansion and other application." These patents/applications are hereby incorporated by reference as if set forth fully herein.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein.

Figure 2A:
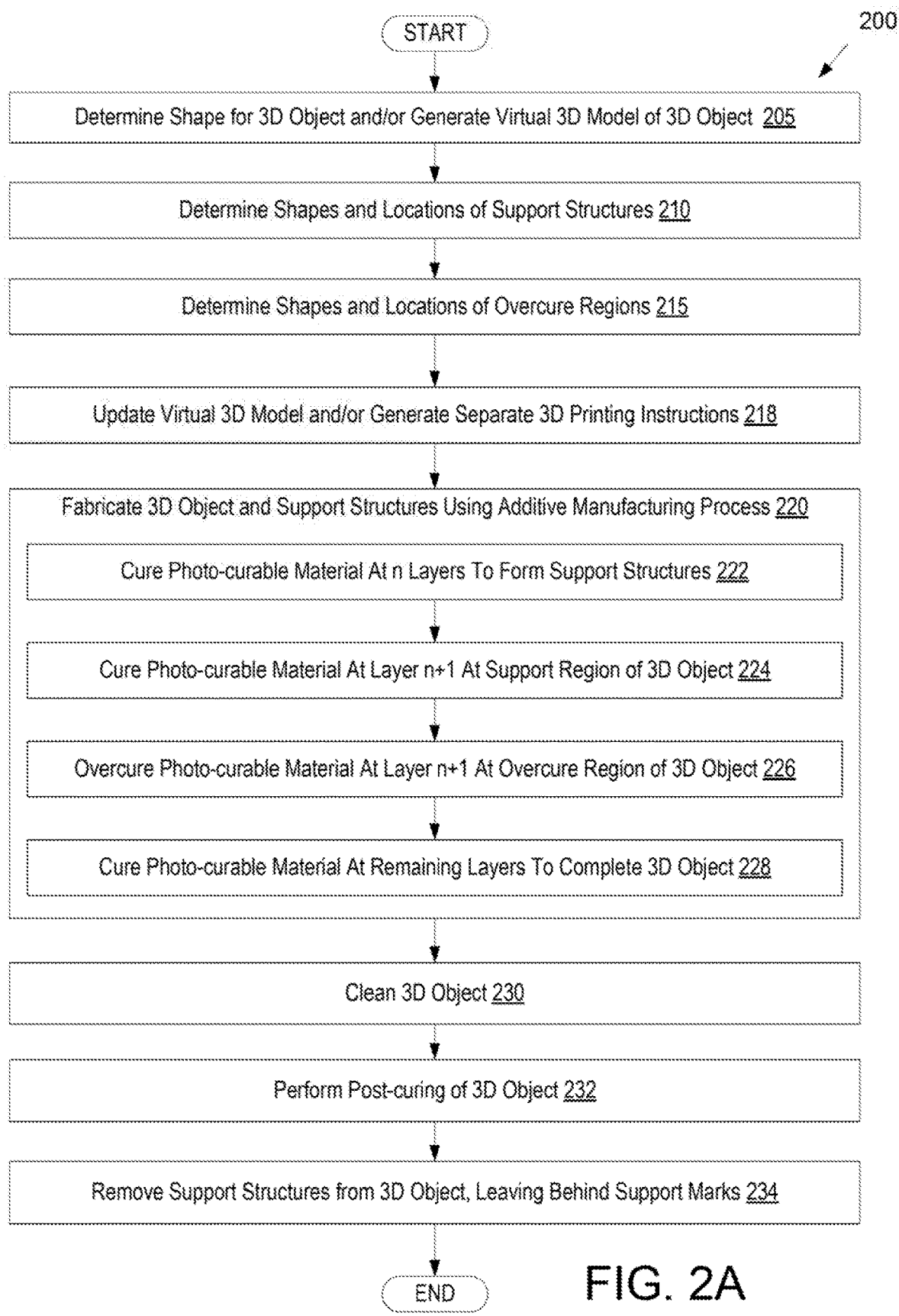
FIG. 2A illustrates a flow diagram for a method of fabricating a 3D object with recessed support marks, in accordance with one embodiment.

FIG. 2A illustrates a flow diagram for a method 200 of fabricating a 3D object with recessed support marks, in accordance with multiple embodiments. In some embodiments, one or more operations of method 200 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 200 may be performed by a 3D object modeling module such as 3D object modeling module 1250 of FIG. 12. Additionally, some operations may be performed by a fabrication machine (e.g., a 3D printer) based on instructions received from processing logic. Some operations may alternately be performed by a user (e.g., based on user interaction with a 3D object modeling module and/or user manipulation of the 3D object).

At block 205 of method 200, a shape of a 3D object is determined and/or a virtual 3D model of the 3D object is generated. In one embodiment, the shape is determined based on a scan of an object to be modeled. In the example of orthodontics, an intraoral scan of a patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). For example, a virtual 3D model of a dental appliance may be generated based on a virtual 3D model of a dental arch on which the dental appliance will be placed. Alternatively, an initial negative mold may be generated from an actual object to be modeled. The negative mold may then be scanned to determine a shape of a positive mold that will be produced. In other examples, a 3D virtual model of the 3D object may be generated by a user and/or processing logic (e.g., using a computer aided drafting (CAD) application) without image data.

Referring back to the example of orthodontics, multiple different molds may be generated for a single patient. A first mold may be a model of a patient's dental arch and/or teeth as they presently exist, and a final mold may be a model of the patient's dental arch and/or teeth after correction of one or more teeth and/or a jaw. Multiple intermediate molds may be modeled, each of which may be incrementally different from previous molds. Aligners may be formed from each mold to provide forces to move the patient's teeth. The shape of the final mold and each intermediate mold may be determined by computing the progression of tooth movement throughout orthodontic treatment from initial tooth placement and orientation to final corrected tooth placement and orientation. Each mold may be used to fabricate an aligner that will apply forces to the patient's teeth at a particular stage of the orthodontic treatment. Alternatively, multiple different orthodontic aligners may be directly printed, where each orthodontic aligner is to be used for a different stage of orthodontic treatment.

At block 210, processing logic determines shapes and locations of support structures. The locations and shapes of the support structures may automatically be determined based on the shape of the 3D object to be printed to maintain the 3D object at a particular level of rigidity, to maintain the 3D object at a particular position and/or orientation relative to a build platform, and so on. In one embodiment, the shapes of the support structures are determined such that the support structures narrow at or near a contact point with the 3D object. This may ensure that when the support structures are removed from (e.g., broken off of, cut from, or otherwise separated from) the 3D object, a residual support mark will be at a particular location and have a particular height or thickness. Processing logic may also determine shapes and/or locations of support regions on the 3D object, where the support regions may include areas of the 3D object that will contact the support structures as well as a space or perimeter around the areas of the 3D object that will contact the support structures. In some embodiments, processing logic determines an orientation of an object to be printed, and determines numbers, shapes, orientations and/or locations of support structures relative to the orientation of the object.

At block 215, processing logic determines shapes and locations of overcure regions. The overcure regions may be distinct regions from the support regions. The overcure regions may be regions of the 3D object that will be overcured. The overcure regions may be determined such that an outer surface, profile, edge, perimeter, etc. of the 3D object will correspond to the overcure regions rather than to the support regions. In one embodiment, the overcure regions face a light source used to cure layers of the 3D object during the additive manufacturing process. Accordingly, the overcure regions may define, for example, a bottom surface, profile, edge, perimeter, etc. of the 3D printed object, but may not define a top surface, profile, edge, perimeter, etc. in one example.

At block 218, the virtual 3D model may be updated based on the determined support structures and/or the determined overcure regions. Alternatively, or additionally, separate 3D printing instructions may be generated (e.g., a separate file that is computer readable, and more particularly that is readable by a 3D printer), where the separate 3D printing instructions may represent the 3D model of the 3D object and incorporate instructions for the support structures and the overcure regions. In one embodiment, an outermost edge of one side and/or portion of the 3D object corresponds to the overcure region and is specified in the computer readable instructions.

At block 220, the 3D object and support structures are fabricated using an additive manufacturing process. In one embodiment, the additive manufacturing process is performed in a stepwise manner, where a different layer of the 3D object is fabricated at each step, and wherein overcuring is performed at one or more predetermined layers and locations. In one embodiment, the 3D object is fabricated based on a 3D virtual model of the mold. In one embodiment, the 3D object is fabricated using a rapid prototyping manufacturing technique. One example of a rapid prototyping manufacturing technique is 3D printing. 3D Printing includes any layer-based additive manufacturing processes. A 3D printer may receive an input of the 3D virtual model of the 3D object with separable features (e.g., as a computer aided drafting (CAD) file or 3D printable file such as a stereolithography (STL) file), and may use the 3D virtual model to create the mold. 3D printing may be achieved using an additive process, where successive layers of material are formed in proscribed shapes. 3D printing may be performed using extrusion deposition, granular materials binding, lamination, photopolymerization, or other techniques.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin, a photocurable resin, a photopolymer, or any other material commonly known to those of ordinary skill in the art) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold.

SLA may include top down SLA (also referred to as right-side up SLA), in which a light source that cures the photo-curable material is above the build platform. For top down SLA, the platform is lowered incrementally, and the light source traces a new pattern over the platform to form another layer of the mold at each increment. This process repeats until the mold is completely fabricated.

SLA may include bottom up SLA (also referred to as inverted SLA or upside-down SLA), in which the light source is below the build platform. In bottom up SLA, a portion of a platform begins within a shallow bath of a liquid photopolymer or resin just below a surface of the bath. A light source (e.g., an ultraviolet laser) traces a pattern over the platform from the bottom through a transparent bottom with a non-stick surface, curing the photopolymer where the light source is directed, to form a layer of the object. The platform is raised incrementally, and the light source traces a new pattern over the platform to form another layer of the object at each increment. This process repeats until the object is completely fabricated.

For both top down SLA and bottom up SLA, each layer may have an approximately uniform thickness of between 25 microns and 200 microns in embodiments.

Another 3D printing technique that may be used is digital light processing (DLP). DLP functions in much the same manner as SLA, except that with SLA the light source is generally a laser and with DLP the light source is a DLP projector. DLP techniques include top down DLP and bottom up DLP.

In one embodiment, fabricating the 3D object and support structures includes performing the operations of blocks 222-228. FIGS. 2B-2I illustrate a cross sectional side view of a fabricated support structure and 3D object at various stages of an additive manufacturing process, in accordance with one embodiment. FIGS. 2B-2I may correspond to the result of the operations of one or more of block 222-228 in embodiments.

At block 222, a 3D printer cures a photo-curable polymer or other photo-curable materials at layers 1 through n to form one or more support structures. One or more of layers 1 through n may also form portions of the 3D object. For example, layer n may correspond to a support structure at one location and to a portion of the 3D object at another location. Support structures may have constant and/or variable spacing, may be equidistant, may have a constant and/or varied height, may be angled up, may be regular or irregular, and so on. Curing may be performed using a first exposure time and a first energy level that are selected to cure a first thickness of the photocurable polymer corresponding to a layer.

Figure 2B:
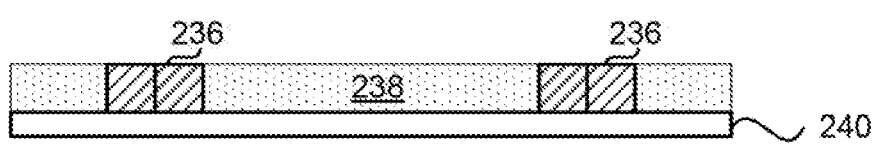
FIGS. 2B-2K illustrate a cross sectional side view of a fabricated support structure and 3D object at various stages of an additive manufacturing process, in accordance with one embodiment.
Figure 2C:
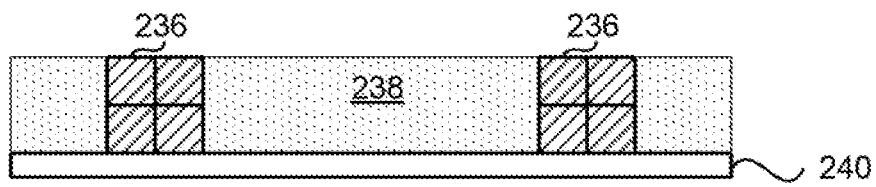
Figure 2D:
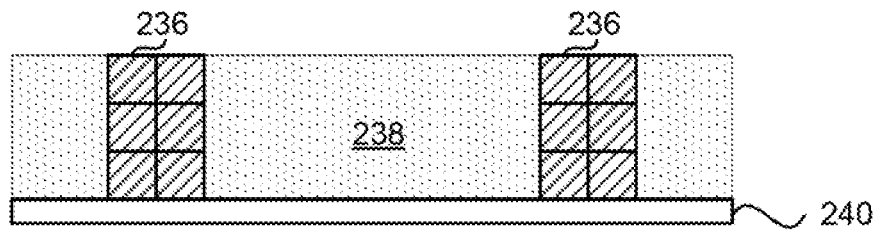
Figure 2E:
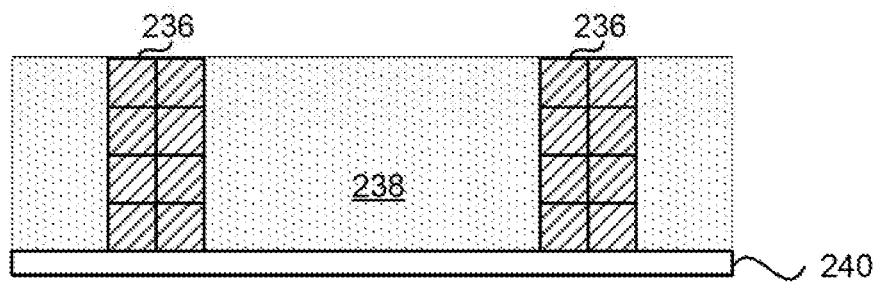
Figure 2F:
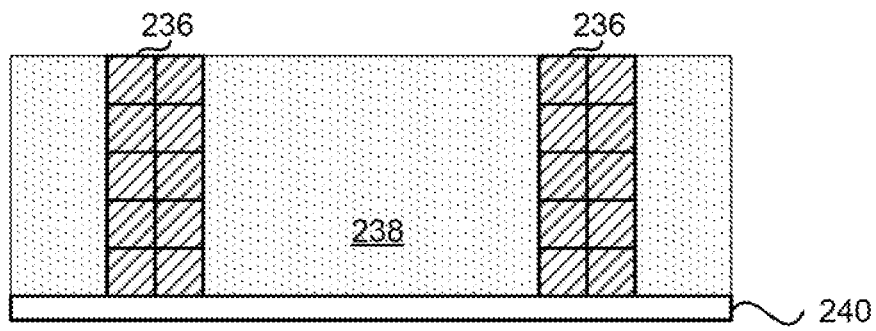
Figure 2G:
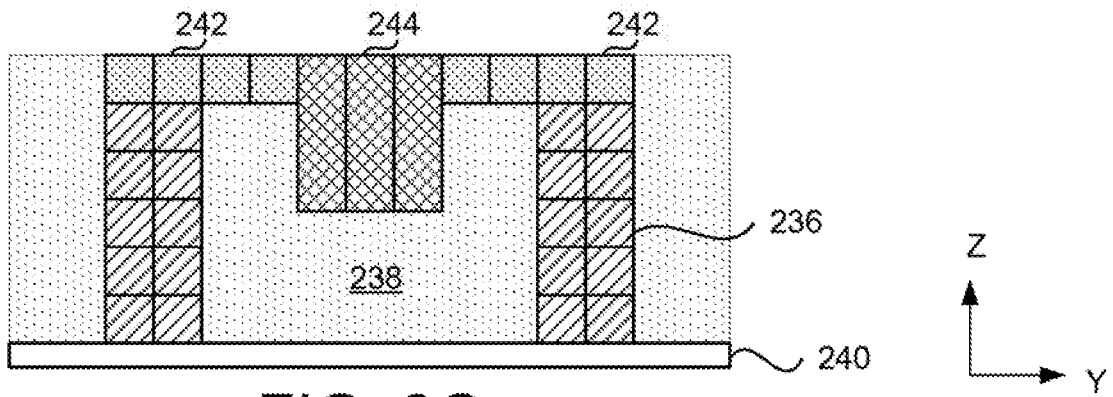

FIGS. 2B-2F illustrate the curing of a photo-curable material at locations to form support structures. In FIG. 2B, a build platform 240 is positioned at a particular height such that a distance between a top of the build platform 240 and a top surface of the photocurable material 238 is a layer thick. A first layer is cured at selective locations to form a first layer of support structures 236. In FIG. 2C, the build platform is lowered such that a distance between a top of the first layer and the top of the photo-curable material is equal to a layer of thickness. The second layer is cured at selective locations for form a second layer of the support structures 236. In FIG. 2D, the build platform is lowered such that a distance between a top of the second layer and the top of the photo-curable material 238 is equal to a layer of thickness. The third layer is cured at selective locations for form a third layer of the support structures 236. In FIG. 2F, the build platform is lowered such that a distance between a top of the third layer and the top of the photo-curable material 238 is equal to a layer of thickness. The fourth layer is cured at selective locations for form a fourth layer of the support structures 236. In FIG. 2G, the build platform is lowered such that a distance between a top of the fourth layer and the top of the photo-curable material 238 is equal to a layer of thickness. The fifth layer is cured at selective locations for form a fifth layer of the support structures 236.

Referring back to FIG. 2A, at block 224, the 3D printer cures the photo-curable material at layer n+1 at one or more support regions of the 3D object. Depending on the geometry of the 3D object, layer n+1 may also be cured at some locations to further form support structures. The bottom surface of the 3D object may be flat or non-flat, may be horizontal or angled, may be curved, and/or may have a complex geometry and/or other shape.

At block 226, the 3D printer overcures the photo-curable material at layer n+1 at one or more overcure regions of the 3D object. The overcuring is performed using a second exposure time and a second energy level that are selected to cure a second thickness of the photocurable polymer that is greater than the first thickness (e.g., that is greater in thickness than a single layer). The second exposure time may be greater than the first exposure time and/or the second energy level may be greater than the first energy level to achieve the overcure. The overcure causes the overcure region (e.g., a bottom of the overcure region) to extend past (e.g., below) layer n+1, and optionally below layer n, below layer n−1, below layer n−2, and/or below further previously cured layers.

FIG. 2G illustrates that the build platform has been lowered such that a distance between a top of the fifth layer and the top of the photo-curable material 238 is equal to a layer of thickness. A sixth layer is cured at selective locations for form a portion of a bottom layer of the 3D object 242. Additionally, the sixth layer is overcured at selective locations to form an overcured region 244 of the bottom layer of the 3D object. As shown, the thickness of the overcured region is greater than the thickness of a single layer of the 3D object and/or support structure. In particular, the overcured region extends deeper into the photo-curable material 238 than a single layer, such that a distance from the top of the build platform 240 and a bottom of the overcure region 244 is less than a distance from the top of the build platform 240 and a bottom of the sixth layer.

Referring back to FIG. 2A, at block 228, the 3D printer cures the photo-curable material at one or more remaining layers to form a remainder of the 3D object and/or a remainder of one or more support structures. The support structures may end and the 3D object may begin at different layers in different locations of the 3D object. Additionally, the overcure region may begin at different layers in different locations of the 3D object. Accordingly, the bottom surface of the 3D object may begin at different layers, depending on the shape of the object and the x,y positions in question. Accordingly, the layer "n" and the layer "n+1" may be different layers at different x,y locations.

Note that during the 3D printing process the "bottom" of the 3D object is considered to be the side of the 3D object that faces the build platform. However, the "bottom" of the 3D object during printing may not correspond to the bottom of the 3D object after the 3D object is complete. For example, a side of the 3D object, top of the 3D object, etc. may face the build platform during the additive manufacturing process.

Figure 2H:
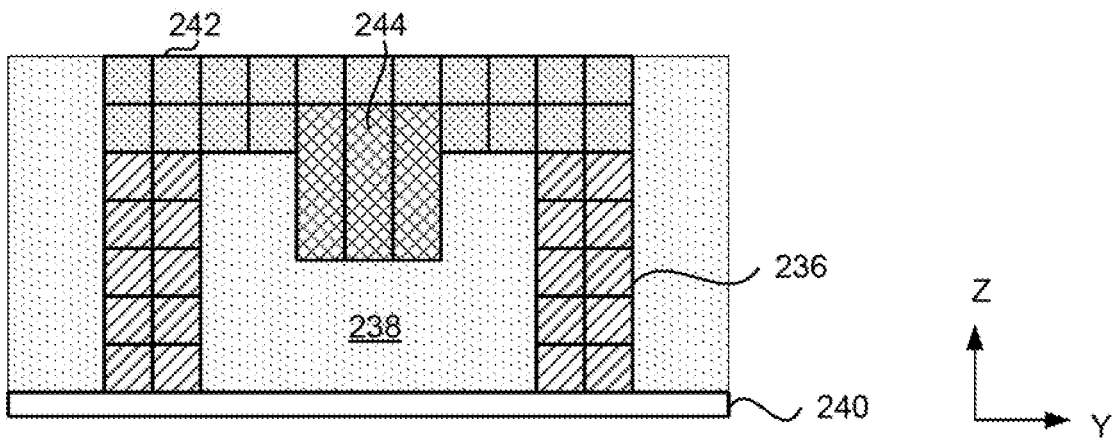
Figure 2I:
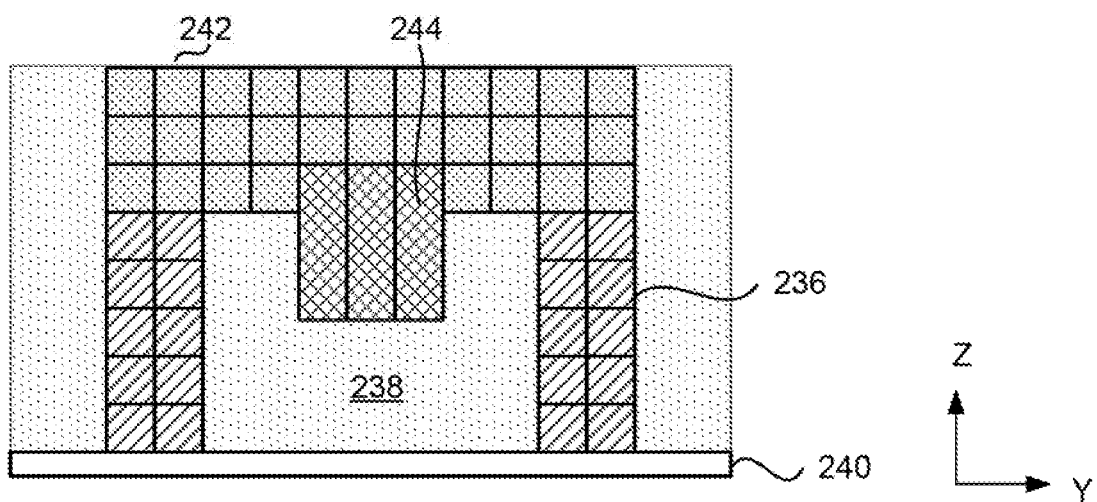

FIG. 2H illustrates that the build platform has been lowered such that a distance between a top of the sixth layer and the top of the photo-curable material 238 is equal to a layer of thickness. A seventh layer is cured at selective locations for form a portion of a second layer of the 3D object 242. FIG. 2I illustrates that the build platform has been lowered such that a distance between a top of the seventh layer and the top of the photo-curable material 238 is equal to a layer of thickness. An eighth layer is cured at selective locations for form a portion of a third layer of the 3D object 242.

Referring back to FIG. 2A, at block 230 the 3D object (and optionally the support structures) may be cleaned, such as with water, acetone, and/or or solvents. At block 232, post-curing o the 3D object and/or support structures may be performed to further harden the 3D object and/or support structures.

Figure 2J:
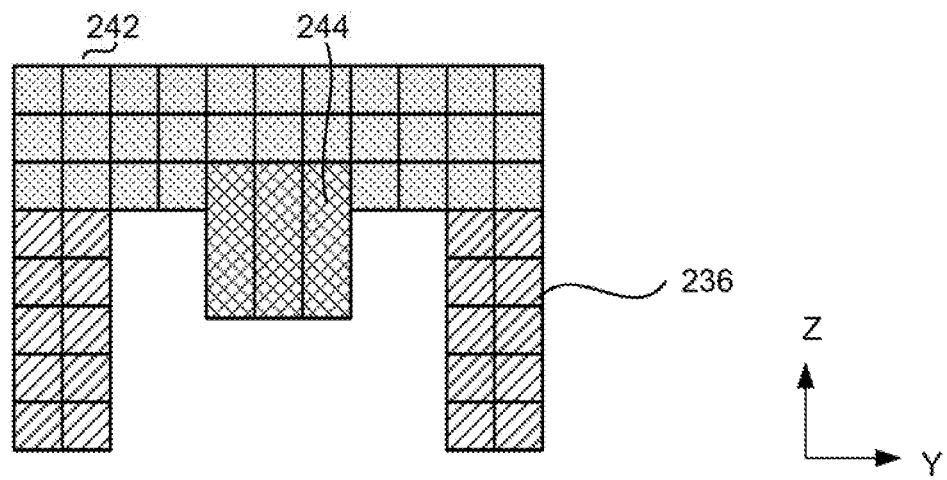

FIG. 2J illustrates the printed 3D object 242 with the overcure region 244 and support structures 236. As shown, the 3D object 242 may include optical and/or tactile evidence of layering that is representative of the additive manufacturing process. Each of the layers may have an approximately equal thickness (e.g., a thickness that varies by less than +/−25% in some instances). The overcure region may have a thickness that is greater than the layer thickness. For example, the overcure region may have a thickness that is 1.5× the layer thickness, 2× the layer thickness, 2.5× the layer thickness, 3× the layer thickness, or some other greater thickness than the layer thickness.

Referring back to FIG. 2A, at block 234 the support structures are removed from the 3D object, such as by breaking the supports structures off of the 3D object, cutting the support structures, and so on. The support structures may have been designed such that they will break at a point that is indented from a lower our outer surface or profile of the overcure region. This may leave behind support marks that do not project beyond the lower or outer surface or profile of the overcure region.

Figure 2K:
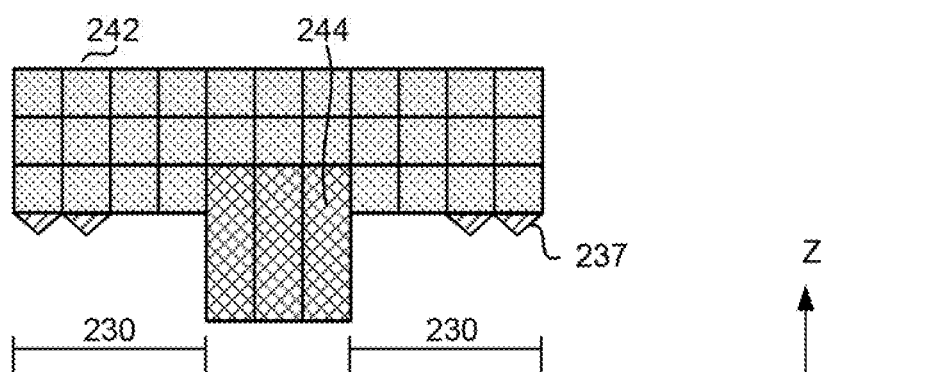

FIG. 2K illustrates the printed 3D object 242 with the overcure region 244 after removal of the support structures 236. Support marks 237 remain after removal of the support structures 236. As shown, the support marks 237 are indented or recessed from the bottom surface of the overcure region 244. The support marks 237 are in support regions 230, which may have a larger horizontal cross sectional area than a horizontal cross sectional area than the support marks 237. Accordingly, the overcure region (and other overcure regions not shown in this example) may form an outer surface, profile, perimeter and/or edge that projects past the support marks. The outer profile of the 3D object as defined by the overcure regions 244 may have a shape and dimensions that were specified in a virtual 3D model and may be within design tolerances. Accordingly, the support marks may be left on the 3D object without impacting a functionality of the 3D object, without impacting an esthetic of the 3D object, and without causing the 3D object to deviate from its design tolerances. In embodiments, an outer profile (e.g., bottom profile) of the 3D object that corresponds to the overcure region is substantially smooth. In embodiments, the outer profile of the 3D object defined by the overcure region or regions is at least one of substantially level, substantially flat, substantially even, substantially straight or substantially curved.

Figure 3:
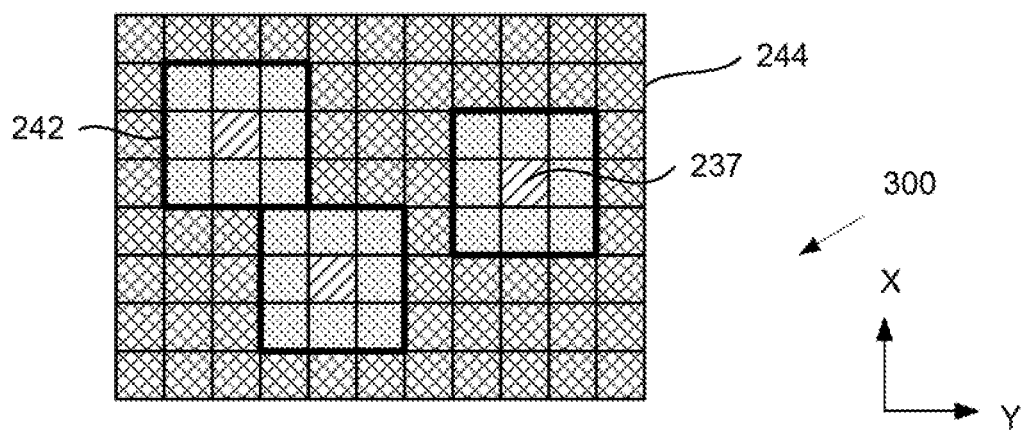
FIG. 3 illustrates a bottom view of a bottom surface of a 3D printed object having recessed support marks, in accordance with one embodiment.

FIG. 3 illustrates a bottom view of a bottom surface of a 3D printed object 300 having recessed support marks 237, in accordance with one embodiment. As shown, the bottom surface of the 3D printed object 300 includes a relatively large overcure region 244 and multiple support regions 242. Each support region includes at least one support mark 237. In some embodiments, a first horizontal cross section of the support region 242 is larger than a second horizontal cross section of the support mark 237 (and larger than a horizontal cross section of a support structure that resulted in the support mark) to provide a separation between the support mark 237 (and support structure) and the overcure region 244. This may improve a clean break and separation of the support structure from the 3D printed object 300. As shown, the locations of the overcure region 244, support regions 242 and support marks 237 may vary depending on x,y position.

Figure 4B:
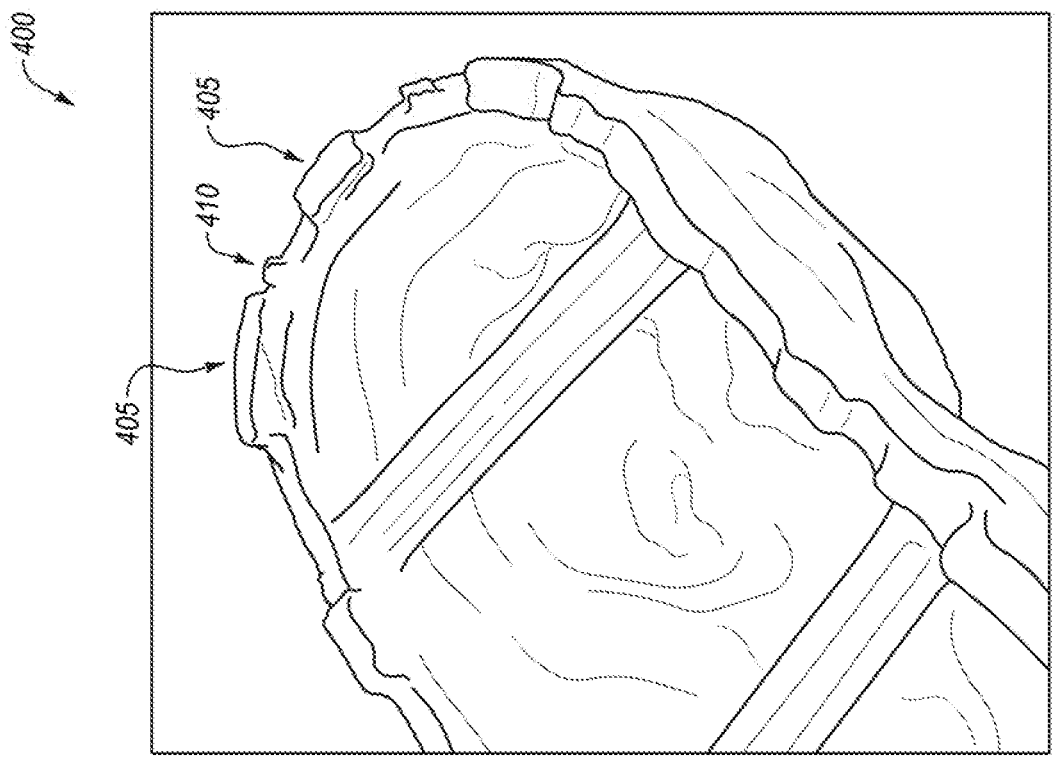
FIGS. 4A-4B illustrate bottom perspective views of a mold of a dental arch having overcured regions and recessed support marks at support regions, in accordance with one embodiment.
Figure 4A:
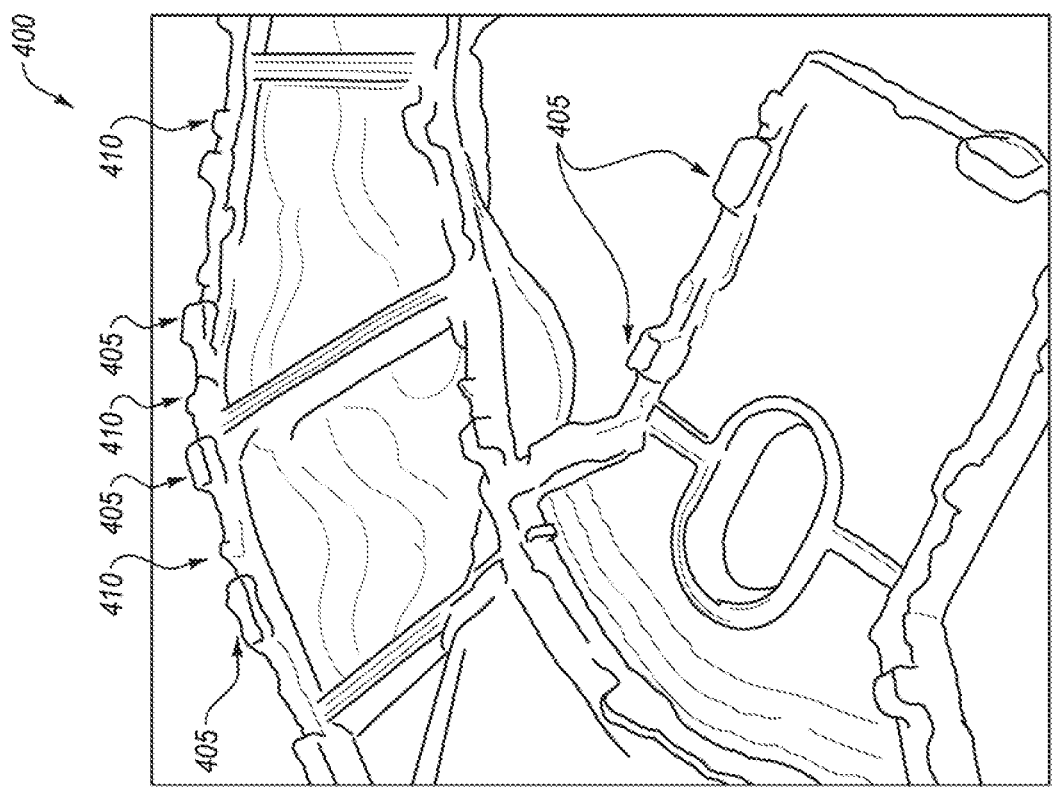

FIG. 4A illustrates a bottom perspective view of a mold 400 of a dental arch having overcured regions 405 and recessed support marks 410 at support regions, in accordance with one embodiment. FIG. 4B illustrates another bottom perspective view of mold 400, in accordance with one embodiment. Overcure regions 405 may together form a flat bottom surface/edge/profile of the mold 400. Support marks 410 may be recessed from the bottom surface/edge/profile defined by the overcure regions 405, and do not interfere with the flatness of the bottom surface. In the illustrated embodiment, multiple separated overcure regions 405 are provided, that together form projections (e.g., reminiscent of crenellations) on the bottom surface of the mold 400.

Figure 5A:
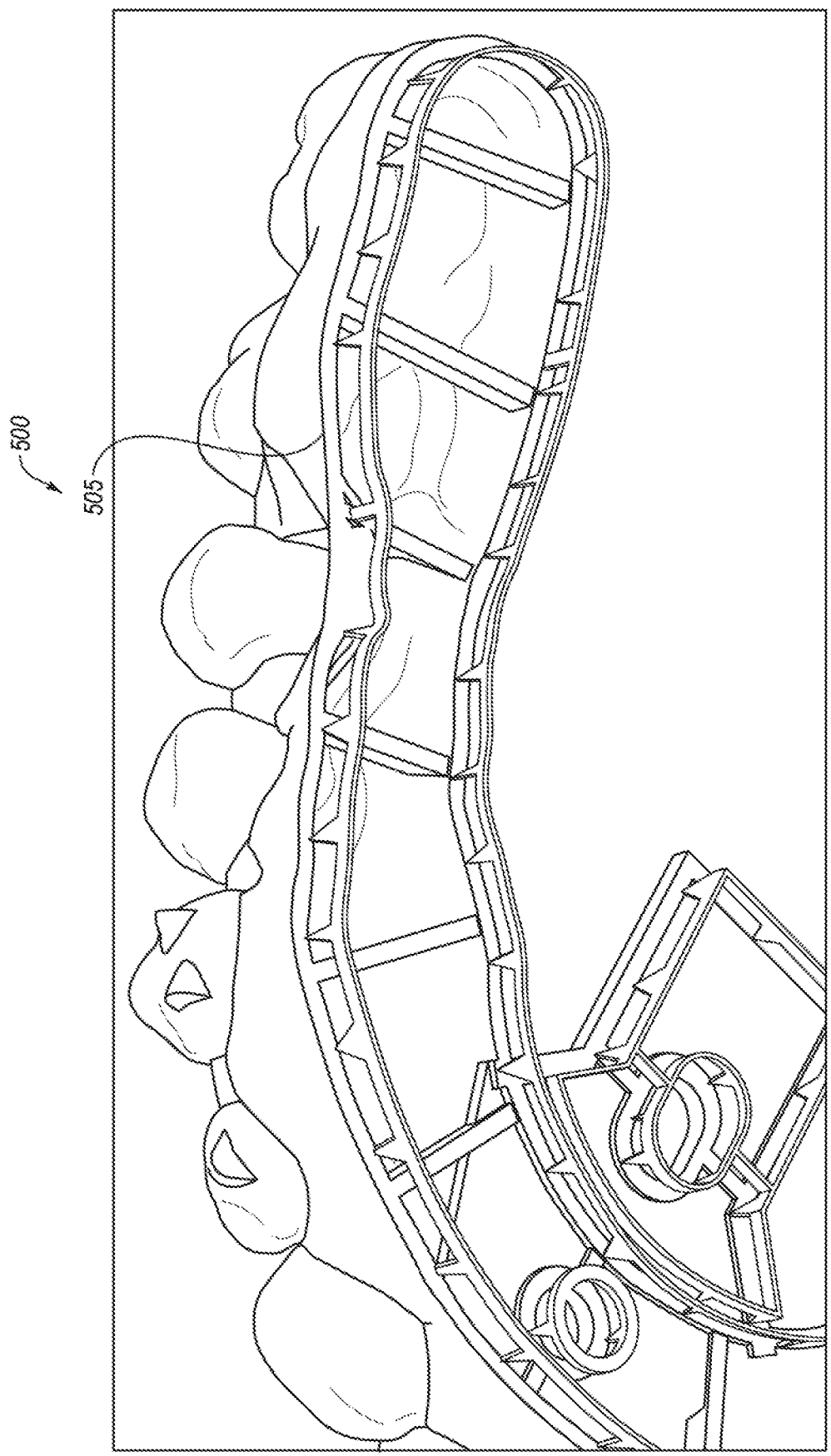
FIG. 5A illustrates virtual 3D model of a mold of a dental arch, in accordance with an embodiment of the present disclosure.

FIG. 5A illustrates virtual 3D model 500 of a mold of a dental arch, in accordance with an embodiment of the present disclosure. As shown in the virtual model 500, an outer perimeter of the bottom surface edge of the mold may form a single extended overcure region 505. Additionally, an inner perimeter of the bottom surface edge of the mold may form support structures. Accordingly, the overcure region may form a continuous edge or perimeter of the mold.

Figure 5B:
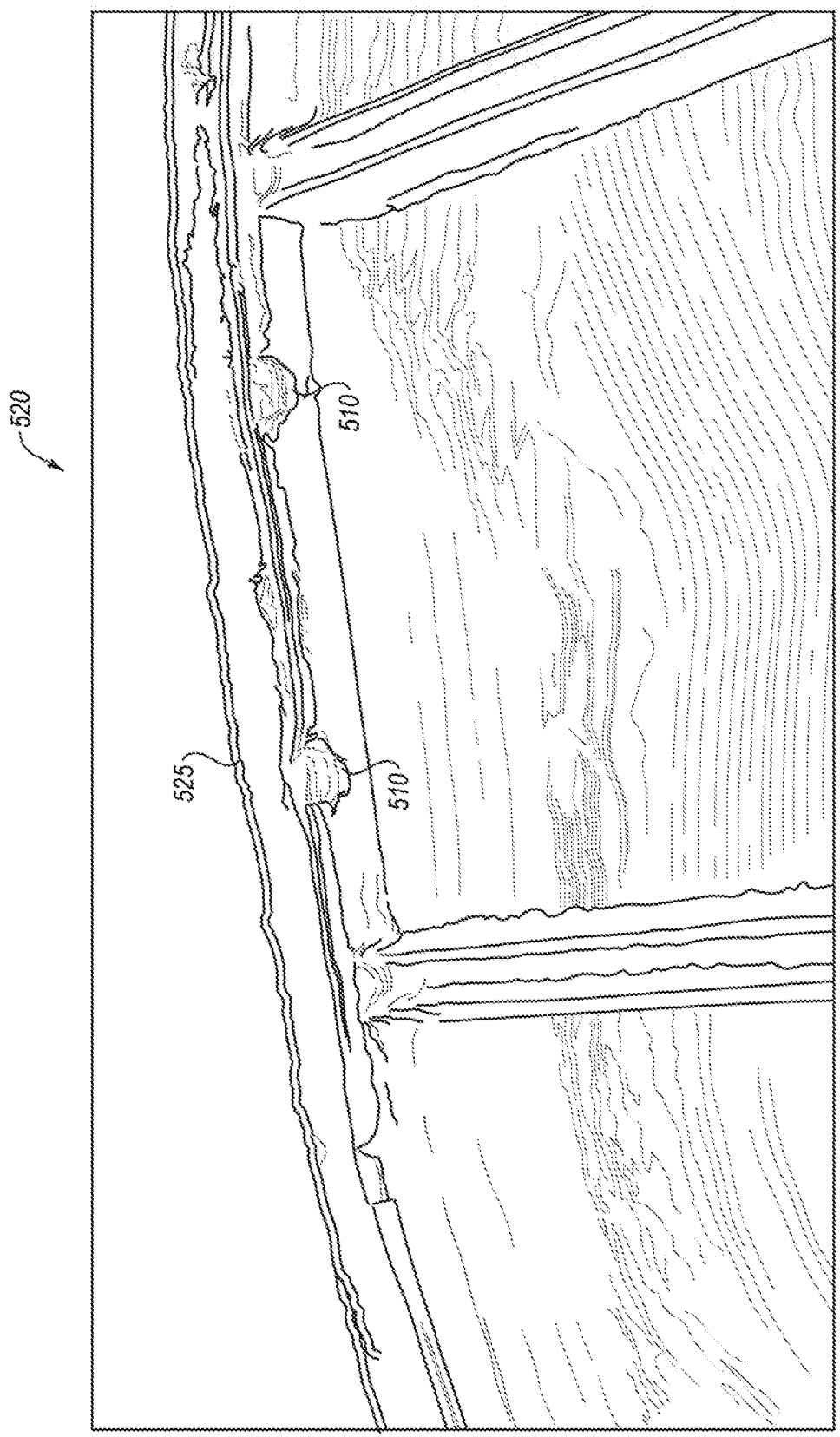
FIG. 5B illustrates an example mold of the dental arch of FIG. 5A after support structures have been removed from the mold, in accordance with one embodiment.

FIG. 5B illustrates an example mold 520 manufactured from the digital model 500 of the dental arch of FIG. 5A after support structures have been removed from the mold, in accordance with one embodiment. As shown, a continuous overcure region 525 defines an outer bottom perimeter of the mold 520. Support marks 510 are recessed and do not project past the outer profile defined by the support region 525. In embodiments, the overcure region defines a lip of a surface of the mold 520, and the support marks 510 are horizontally and vertically inset from the lip defined by the overcure region. In embodiments, the lip is a continuous surface edge of the mold 520.

As discussed above, support structures may end at different layers depending on x,y location and the shape of the 3D object being printed. Additionally, support regions and overcure regions may begin at different layers depending on the x,y location and the shape of the 3D object being printed. FIGS. 6A-6C and FIGS. 7A-7C show a few examples of 3D printed objects having support regions and overcure regions that begin at different layers/z-positions depending on y-position (and/or x-position).

FIG. 6A illustrates an example printed 3D object 600 with overcure regions 615 and support regions 610, in accordance with one embodiment. The 3D object 600 is connected to a platform 620 by support structures 605 that contact the 3D object at support regions 610. As shown, the bottom surface of the 3D object 600 is at an angle relative to the platform 620 and the overcure regions 615 and support regions 610 have different z coordinates at different y coordinates (e.g., start at different layers based on the y coordinate).

FIG. 6B illustrates the example printed 3D object 600 of FIG. 6A with recessed support marks 625 that remain after removal of the support structures from the 3D object 600, in accordance with one embodiment. As shown, the support marks are recessed from an outer perimeter or profile defined by the overcure regions 615. In one embodiment, the support marks 625 are approximately tangentially inset from the surface profile of the 3D object 600 defined by the overcure regions 615.

Figure 6C:
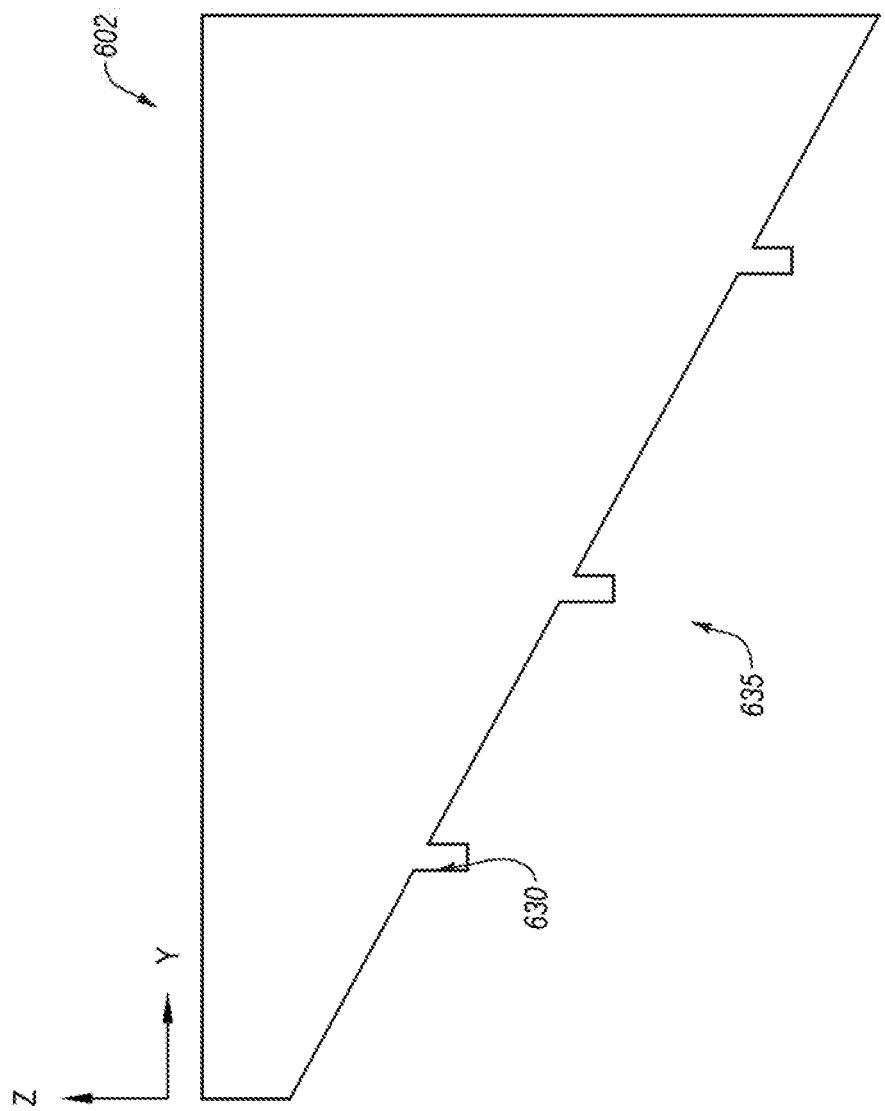
FIG. 6C illustrates an example printed 3D object with support marks that extend past a profile of the 3D object.

FIG. 6C illustrates an example printed 3D object 602 with support marks 630 that extend past a profile of the 3D object. 3D printed object 602 was formed without applying an overcure. Comparing printed 3D object 602 to printed 3D object 600, it can be seen that printed object 600 has a flat or approximately flat surface 630 while a corresponding surface 635 of printed object 602 is not approximately flat due to the projecting support marks 630.

FIG. 7A illustrates an example printed 3D object 700 with overcure regions 715 and support regions 710, in accordance with one embodiment. The 3D object 700 is connected to a platform 720 by support structures 705 that contact the 3D object at support regions 710. As shown, the bottom surface of the 3D object 700 is curved and the overcure regions 715 and support regions 710 have different z coordinates at different y coordinates (e.g., start at different layers based on the y coordinate) based on the curve.

FIG. 7B illustrates the example printed 3D object 700 of FIG. 7A with recessed support marks 725 that remain after removal of the support structures from the 3D object 700, in accordance with one embodiment. As shown, the support marks are recessed from an outer perimeter or profile defined by the overcure regions 715. In one embodiment, the support marks 725 are approximately tangentially inset from the surface profile of the 3D object 700 defined by the overcure regions 715.

Figure 7C:
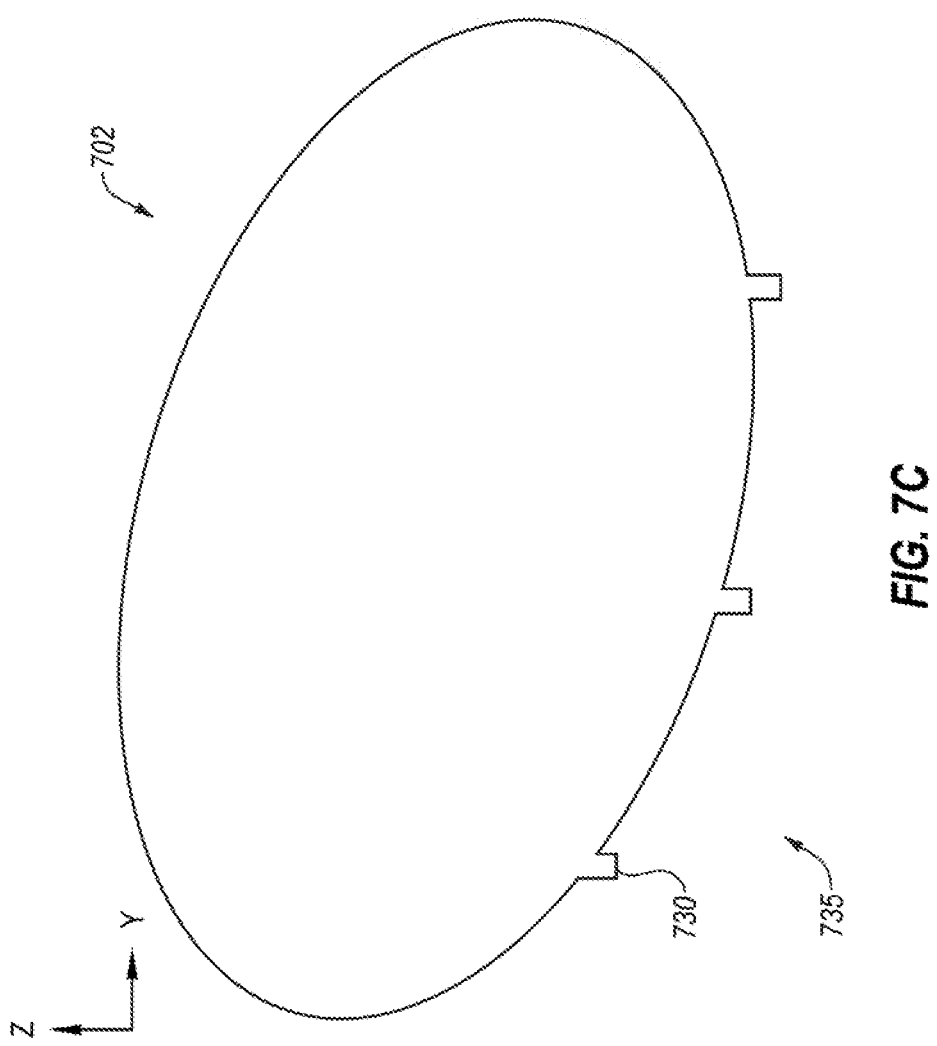
FIG. 7C illustrates an example printed 3D object with support marks that extend past a profile of the 3D object.

FIG. 7C illustrates an example printed 3D object 702 with support marks 730 that extend past a profile of the 3D object. 3D printed object 702 was formed without applying an overcure. Comparing printed 3D object 702 to printed 3D object 700, it can be seen that printed object 700 has a curved surface 730 without interfering protrusions while a corresponding surface 735 of printed object 702 is has the curved surface but with interfering protrusions due to the projecting support marks 730.

Figure 8A:
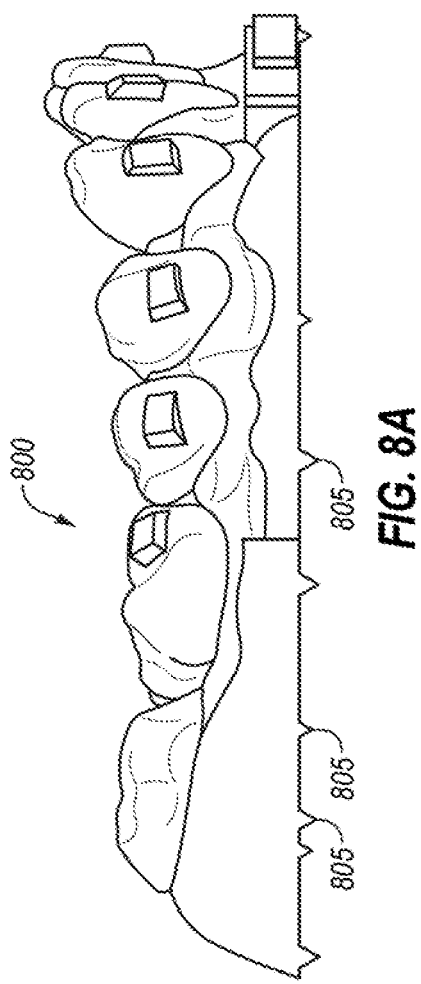
FIG. 8A illustrates an example printed mold of a dental arch with support marks that extend past a bottom profile of the dental arch.

FIG. 8A illustrates an example printed mold 800 of a dental arch with support marks 805 that extend past a bottom profile of the dental arch. The support marks are rough and cause the bottom surface or profile of the mold 800 to be non-flat.

Figure 8B:
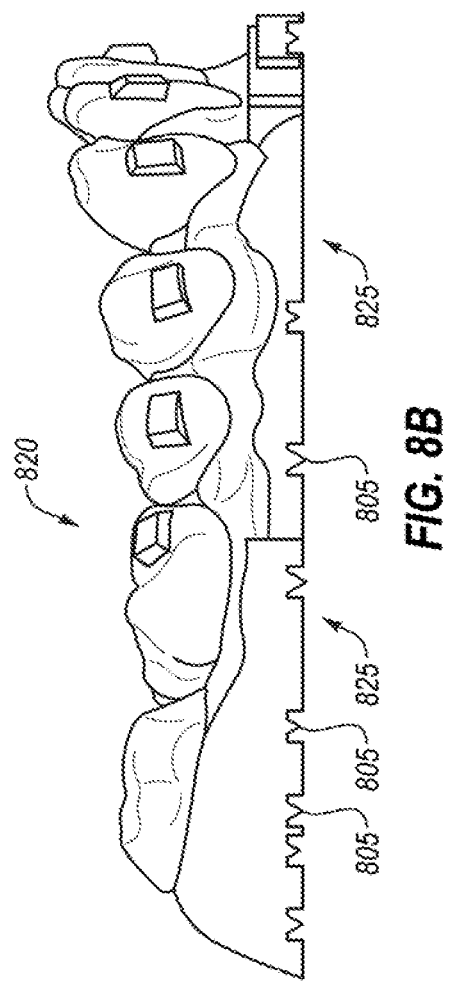
FIG. 8B illustrates the example printed mold of a dental arch with recessed support marks are inset from the bottom profile of the dental arch, in accordance with one embodiment.

FIG. 8B illustrates the example printed mold 820 of a dental arch with recessed support marks 805 that are inset from the bottom profile of the dental arch (e.g., within cavities in the bottom surface of the mold), in accordance with one embodiment. The bottom profile or surface of the mold 820 is defined by overcure regions 825, which together form a flat bottom surface of the mold 820. In embodiments, a top surface of the dental arch is at a known position relative to a bottom surface of the mold (and a flat surface on which the mold is placed).

A dental appliance may be formed over the mold 820. In one embodiment, a sheet of material is pressure formed or thermoformed over the mold. The sheet may be, for example, a sheet of plastic (e.g., an elastic thermoplastic). To thermoform the dental appliance over the mold, the sheet of material may be heated to a temperature at which the sheet becomes pliable. Pressure may concurrently be applied to the sheet to form the now pliable sheet around the mold with the separable feature. Once the sheet cools, it will have a shape that conforms to the mold. In one embodiment, a release agent (e.g., a non-stick material) is applied to the mold before forming the dental appliance, which may be a shell. This may facilitate later removal of the mold from the dental appliance.

The dental appliance may be marked and/or trimmed while it is still on the mold. For example, if the mold is of a dental arch and the dental appliance is an orthodontic aligner to align a patient's teeth, then a gingival cut line (or other cut line) may be identified and cut. A laser cutter, plasma cutter, or mechanical cutter (e.g. a 5 axis milling machine) may be used to cut the gingival cut line or other cut line. In one embodiment, the aligner is not cut until after the aligner is removed from the mold. Alternatively, the aligner may be cut prior to removal of the mold. Alternatively, some trimming may occur before removal of the mold from the aligner and additional trimming may occur after the removal of the mold from the aligner. Marking of the aligner may include using a laser to add a label such as a serial number or part number to the aligner.

The location of the cut line may be carefully selected based on a patient's dentition and gingival line. In some embodiments, the flat bottom surface of the mold 820 defined by the overcure regions enables that height of each location of the mold to be known or determined to a high degree of accuracy. Support marks may be recessed from the bottom surface, and do not interfere with the flatness of the bottom surface. Since the bottom surface is flat, a cutting of the dental appliance at the determined cut line may be performed accurately.

FIG. 9 illustrates a method 950 of orthodontic treatment using a plurality of appliances, in accordance with embodiments. The method 950 can be practiced using a customized orthodontic appliance or a set of customized orthodontic appliances each generated based on a virtual 3D model of a patient's dental arch and/or based on a virtual 3D model of the customized orthodontic appliance. The virtual 3D model may have been generated using intraoral images that were processed and optionally modified in accordance with embodiments described herein. In block 960, a first orthodontic appliance is applied to a patient's teeth in order to reposition the teeth from a first tooth arrangement to a second tooth arrangement. In block 970, a second orthodontic appliance is applied to the patient's teeth in order to reposition the teeth from the second tooth arrangement to a third tooth arrangement. The method 950 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time. The patient can wear each appliance until the pressure of each appliance on the teeth can no longer be felt or until the maximum amount of expressed tooth movement for that given stage has been achieved or until a dentist directs otherwise. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are not permanently affixed to the teeth. The patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 10 illustrates a method 1000 for designing an orthodontic appliance. Some or all of the blocks of the method 1000 can be performed by any suitable data processing system or device, e.g., one or more processors configured with suitable instructions. In block 1010, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth (including crowns and roots), jaws (i.e., mandible and maxilla), gums (i.e., gingiva) and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1020, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 1030, an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like.

In block 1040, instructions for fabrication of the orthodontic appliance or a mold that will be used to manufacture the orthodontic appliance are generated. The instructions can include instructions for producing overcure regions as described herein. In some embodiments, the instructions can be configured for indirect fabrication of the appliance, e.g., by indirect 3D printing of the mold, and then thermoforming a plastic sheet over the mold.

Method 1000 may comprise additional blocks: 1) The upper arch and palate of the patient is scanned intraorally to generate three dimensional data of the palate and upper arch; 2) The three dimensional shape profile of the appliance is determined to provide a gap and teeth engagement structures as described herein.

Figure 11:
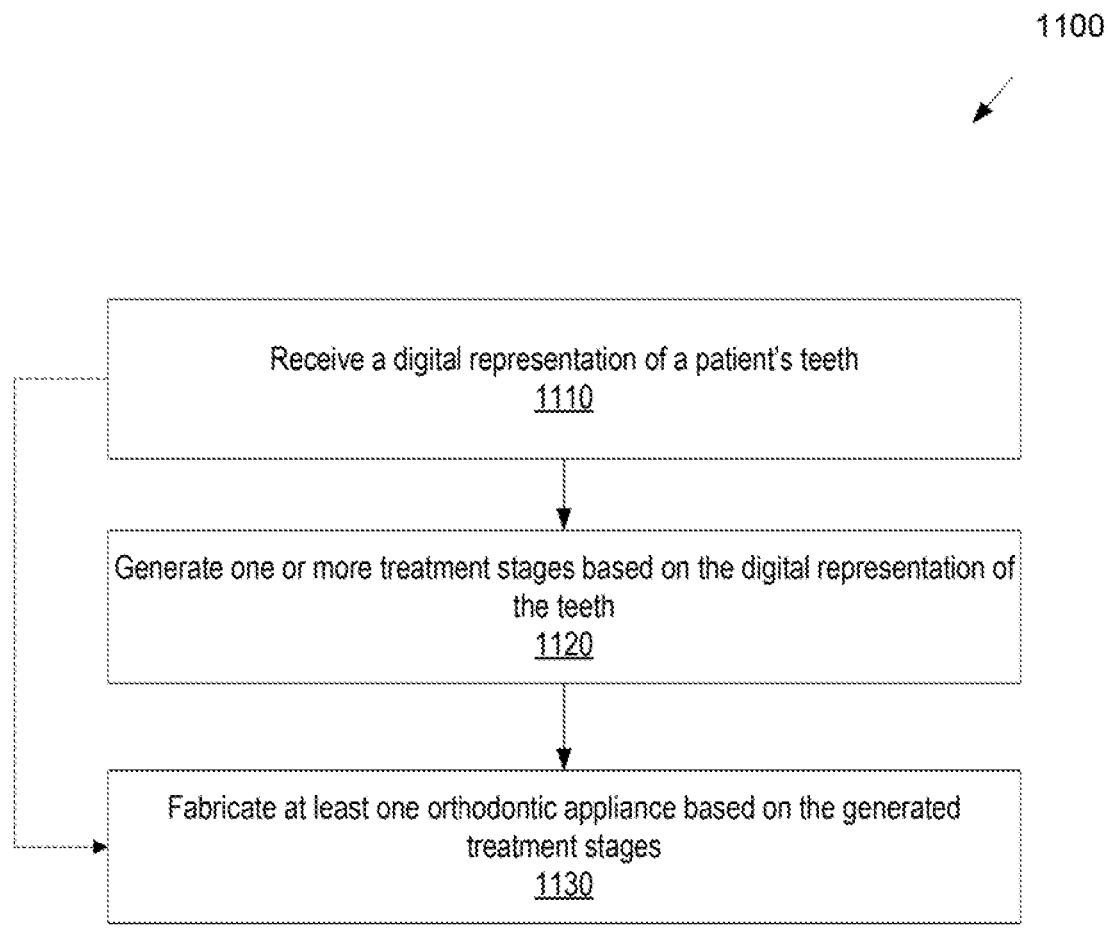
FIG. 11 illustrates a method for digitally planning an orthodontic treatment and/or design or fabrication of an appliance, in accordance with embodiments.

FIG. 11 illustrates a method 1100 for digitally planning an orthodontic treatment and/or design or fabrication of an appliance, in accordance with embodiments. The method 1100 can be applied to any of the treatment procedures described herein and can be performed by any suitable data processing system.

In block 1110, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1120, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1130, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system.

In some instances, staging of various arrangements or treatment stages may not be necessary for design and/or fabrication of an appliance. As illustrated by the dashed line in FIG. 11, design and/or fabrication of an orthodontic appliance, and perhaps a particular orthodontic treatment, may include use of a representation of the patient's teeth (e.g., receive a digital representation of the patient's teeth 1110), followed by design and/or fabrication of an orthodontic appliance based on a representation of the patient's teeth in the arrangement represented by the received representation.

Once designed and/or planned, a series of preformed aligners may be fabricated from a material that, alone or in combination with attachments, imparts forces to a patient's teeth. Example materials include one or more polymeric materials. Fabrication may involve thermoforming aligners using a series of molds (e.g., 3D-printed molds) and/or directly fabricating the aligners. For some thermoforming fabrication techniques, shells are formed around molds to achieve negatives of the molds. The shells are then removed from the molds to be used for various applications. One example application in which a shell is formed around a mold and then later used is corrective dentistry or orthodontic treatment. In such an application, the mold may be a positive mold of a dental arch for a patient and the shell may be an aligner to be used for aligning one or more teeth of the patient. When attachments (e.g., planned orthodontic attachments) are used, the mold may also include features associated with the attachments.

Molds may be formed using a variety of techniques, such as casting or rapid prototyping equipment. For example, 3D printers may manufacture molds of aligners using additive manufacturing techniques (e.g., stereolithography) or subtractive manufacturing techniques (e.g., milling) with the above described overcure techniques. The aligners may then be formed over the molds using thermoforming techniques. Once an aligner is formed, it may be manually or automatically trimmed. In some instances, a computer controlled 4-axis or 5-axis trimming machine (e.g., a laser trimming machine or a mill) is used to trim the aligner along a cutline.

The trimming machine uses electronic data that identifies the cutline to trim the aligner. Thereafter, the aligner may be removed from the mold and delivered to the patient. As another example, aligners may be directly fabricated using, e.g., stereolithography (SLA), digital light processing (DLP), and/or other 3D printing techniques.

Aligners (also referred to herein as "orthodontic aligners") may include dental appliances (also referred to herein as "appliances") applied to a patient's dentition and used to treat malocclusions. An example treatment method using aligners is shown in FIG. 9. Aligners may be formed from polymeric materials using indirect or direct fabrication techniques. As noted further herein, during the indirect fabrication of aligners, many aligners may experience strains/stresses from being removed from molds. Additionally, during use (whether aligners are formed indirectly or directly), many aligners may experience strains/stresses from residing in an intra-oral environment for extended periods of time (e.g., up to twenty-three hours a day for several weeks) or from being repeatedly removed (e.g., up to several times a day for several weeks) from a patient's dentition.

Once designed, each aligner may be manufactured by forming polymeric material to implement one or more stages of a treatment plan on a patient's dentition, e.g., through indirect fabrication techniques or direct fabrication techniques. Examples of indirect and direct fabrication techniques are further described herein above.

In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Figure 12:
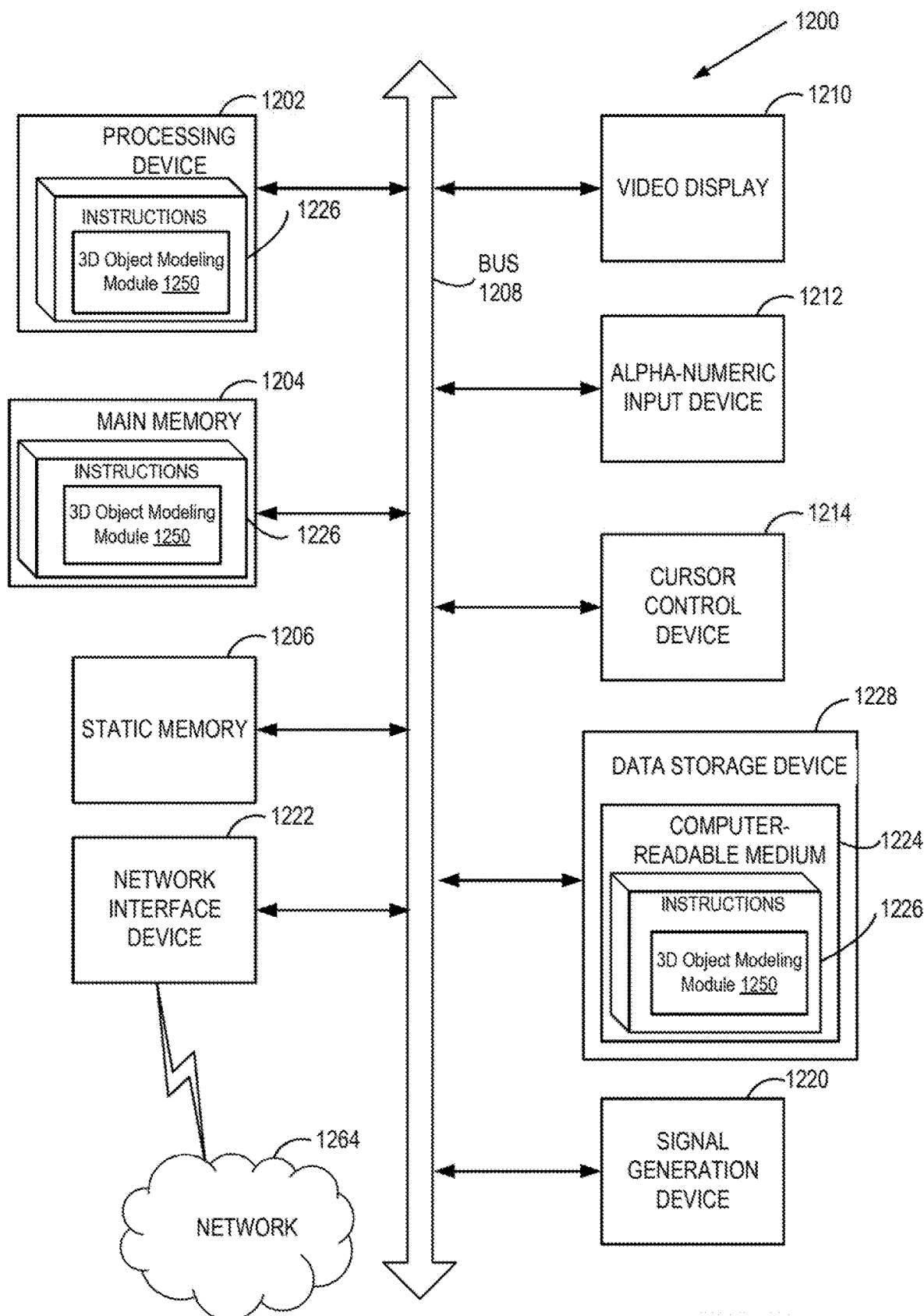
FIG. 12 illustrates a block diagram of an example computing device, in accordance with embodiments of the present disclosure.

FIG. 12 illustrates a diagrammatic representation of a machine in the example form of a computing device 1200 within which a set of instructions, for causing the machine to perform any one or more of the methodologies discussed with reference to FIG. 1. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1200 includes a processing device 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.), and a secondary memory (e.g., a data storage device 1228), which communicate with each other via a bus 1208.

Processing device 1202 represents one or more general-purpose processors such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 1202 is configured to execute the processing logic (instructions 1226) for performing operations and steps discussed herein.

The computing device 1200 may further include a network interface device 1222 for communicating with a network 1264. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1228 may include a machine-readable storage medium (or more specifically a non-transitory computer-readable storage medium) 1224 on which is stored one or more sets of instructions 1226 embodying any one or more of the methodologies or functions described herein. A non-transitory storage medium refers to a storage medium other than a carrier wave. The instructions 1226 may also reside, completely or at least partially, within the main memory 1204 and/or within the processing device 1202 during execution thereof by the computer device 1200, the main memory 1204 and the processing device 1202 also constituting computer-readable storage media.

The computer-readable storage medium 1224 may also be used to store one or more virtual 3D models and/or a 3D object modeling module 1250, which may perform one or more of the operations of method 200 described with reference to FIG. 2A. The computer readable storage medium 1224 may also store a software library containing methods that call a mold modeling module 1250. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

FIG. 13 illustrates an example of a method 1300 for gathering and/or generating a virtual representation if a three-dimensional (3D) object to be fabricated in an additive manufacturing process. The 3D object may be a dental appliance mold in embodiments. One or more operations of the method 1300 may be executed by a computing device, such as the computing device 1200 shown in FIG. 12 and discussed further herein. It is noted that one or more operations of the method 1300 may be executed within input into a user interface, through the use of an automated agent, without human intervention, etc.

At an operation 1302, a virtual representation of a three-dimensional (3D) object to be fabricated in an additive manufacturing process may be gathered. The 3D object may have one or more surfaces with an intended surface profile. An "intended surface profile," as used herein, may include a two-dimensional (2D) profile that represents attributes of a surface of a 3D object. An intended surface profile may be an outline of a surface of the 3D object as viewed from a particular side and/or angle. An intended surface profile may fall within a tolerance zone of the surface. An example of an intended surface profile can include a bottom surface profile of an additively manufactured mold used to thermoform polymeric dental appliances (e.g., aligners). The bottom surface of an additively manufactured mold used to thermoform polymeric dental appliances may have a substantially flat intended surface profile.

At an operation 1304, one or more support structures to be formed in the additive manufacturing process may be identified on the virtual representation and/or from the virtual representation. In some implementations, the one or more support structures may reside on the surface of the 3D object (e.g., a surface with an intended surface profile). The one or more support structures may be configured to support the 3D object on a build platform. As noted herein, the one or more support structures may comprise sacrificial support structures that are to be removed from the 3D object, e.g., during and/or after the additive manufacturing process. In some implementations, the operation 1305 may include providing spatial data and/or facilitating visualization of the support structures. In some implementations, identifying the virtual representation of the one or more support marks includes identifying or determining one or more support regions that are to contain the one or more support marks.

At an operation 1306, one or more support marks to remain on the surface of the 3D object after removal of the support structures are identified on the virtual representation. The support marks may comprise remains of the support structures. The support marks may, but need not, be explicitly shown. As an example, in some implementations, spatial data related to the support marks and/or a visualization of the support marks may be provided. In various implementations, operation 1306 may involve identifying one or more support regions containing support marks and/or that will leave behind support marks when removed.

At an operation 1308, one or more overcure regions on the surface of the 3D object may be identified or determined. The one or more overcure regions may be configured to recess the support marks from the surface to cause the surface to conform to the intended surface profile. In some implementations, the overcure regions may form one or more indentations that recess the support marks into the 3D object relative to the surface. The overcure regions may form a lip to recess the support marks into the 3D object relative to the surface. In some embodiments, the surface conforms to the intended surface profile if the overcure regions each conform to the intended surface profile at particular regions. In such embodiments the support regions may or may not be visible in the intended surface profile, and the support regions may be recessed within the intended surface profile.

At an operation 1310, the 3D object may be fabricated with the overcure regions according to the additive manufacturing process. In some implementations, a stereolithography (STL) file is provided to an additive manufacturing system. The STL file may include representations of the 3D object having support marks and overcure regions as noted herein. The additive manufacturing system may be configured to form the 3D object according to the instructions provided thereto.

A 3D object manufactured according to method 1300 may include at least one surface having an intended surface profile. The 3D object may further include one or more support regions coupled to the at least one surface. Each of the one or more support regions may include one or more support marks, each of the one or more support marks comprising a remaining portion of a corresponding one or more sacrificial support structures partially removed from the one or more support regions. The 3D object may further include one or more overcure regions coupled to the at least one surface. The one or more overcure regions may be distinct from the one or more support regions, the one or more overcure regions forming one or more overcure shapes to recess the one or more support marks of the one or more support regions from the surface to cause the surface to conform to the intended surface profile. In one embodiment, the 3D object is a thermoforming mold. In a further embodiment, the thermoforming mold is used to form a polymeric dental appliance. In one embodiment, the thermoforming mold is one of a plurality of thermoforming molds, the plurality of thermoforming molds used to thermoform a corresponding plurality of aligners to move a patient's teeth from an initial position toward an intended position.

A 3D object manufactured according to method 1300 may include at least one surface having an intended surface profile. The 3D object may further include one or more support regions coupled to the at least one surface, each of the one or more support regions comprising one or more support marks, each of the one or more support marks comprising a remaining portion of corresponding one or more sacrificial support structures partially removed from the one or more support regions. The 3D object may further include means for recessing the one or more support marks of the one or more support regions from the surface to cause the surface to conform to the intended surface profile. The means for recessing the one or more support marks may include, for example, any of the overcure regions discussed herein.

Embodiments have been discussed herein with reference to conventional vertically aligned support structures, such as the support structures 105 of FIG. 1, 236 of FIGS. 2B-2J, 510 of FIG. 5A, 605 of FIGS. 6A-6B, and 705 of FIGS. 7A-7B. However, in some embodiments new angled support structures may be used rather than vertical support structures. Accordingly, any of the aforementioned support structures may be vertical support structures or angled support structures. Additionally, support structures may include a vertically aligned portion and a second portion that is angled with respect to gravity (e.g., at a 30-60 degree angle with respect to vertical).

Angled support structures may be support structures in which all of the support structure is at an angle relative to vertical or in which a part of the support structure is at an angle relative to vertical. Angled support structures involve deliberate design of the geometry of the support structures in a 3D printed object to be quickly removable with a controlled force. The support geometry and applied force are co-designed in a way that facilitates easy removal of the support structures from the printed 3D object.

Figure 14A:
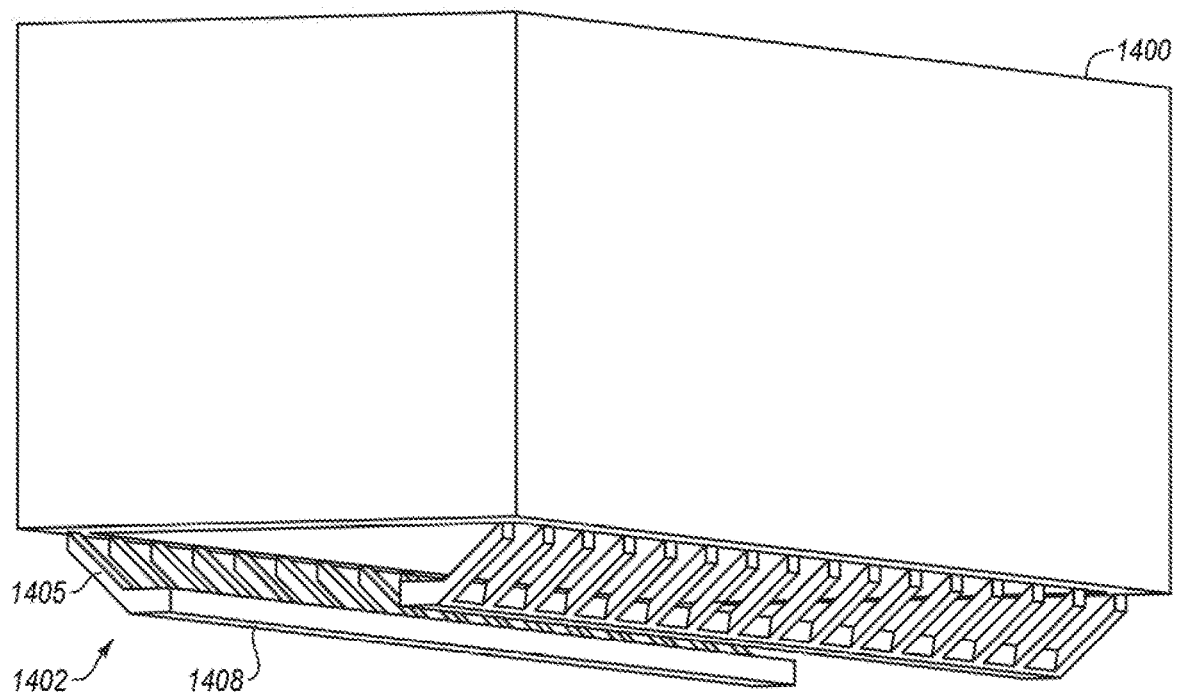
FIGS. 14A-14C show various views of one implementation of a 3D printed object with angled support structures.
Figure 14B:
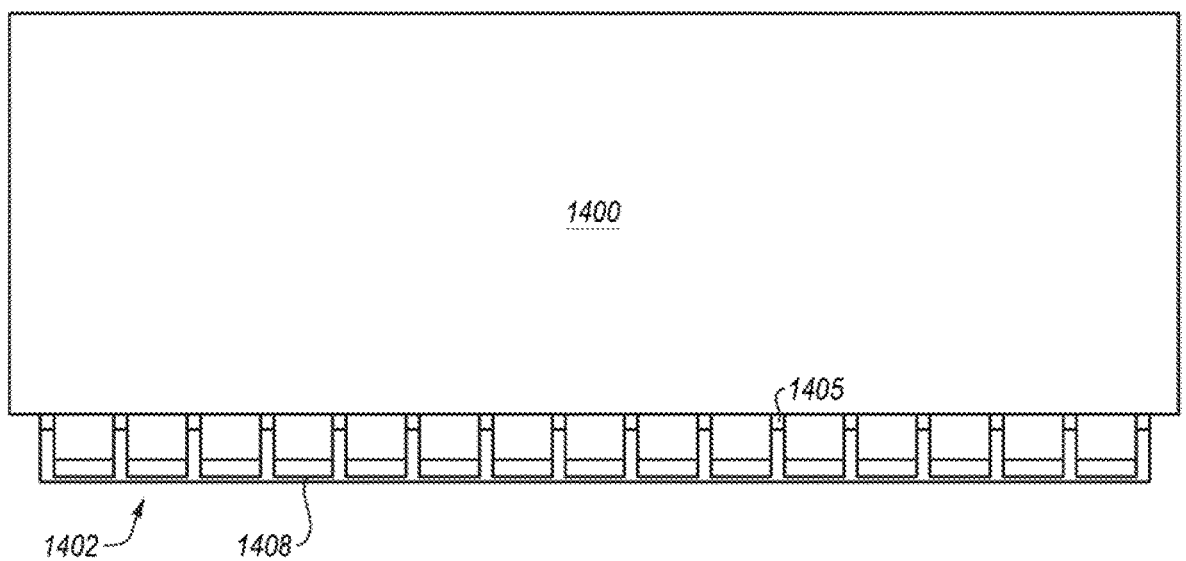
Figure 14C:
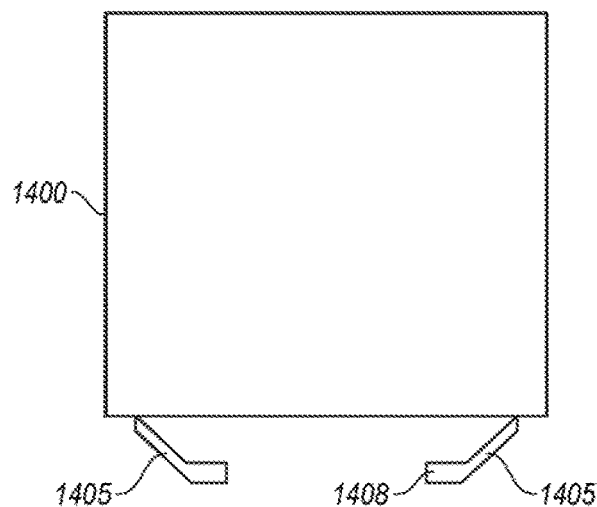

FIGS. 14A-14C show various views of one implementation of a 3D printed object 1400 with angled support structures 1402. FIG. 14A is a perspective view of the 3D printed object 1400. FIG. 14B is a side view of the 3D printed object 1400. FIG. 14C is a front view of the 3D printed object 1400. The 3D object 1400 may be a hollow structure such as a box or a hollowed-out dental model in some embodiments. The angled support structure 1402 may include a base plate 1408 to adhere the angled support structure 1402 to the print platform and a set of angled struts 1405 to connect the printed base plate with the printed object 1400. The struts 1405 may extend at an angle relative to the build platform and relative to vertical (e.g., to gravity). The controlled force usable to separate the printed object 1400 from the support structure 1402 may include a simple motion pressing the object toward the build platform to break away the supports.

This concept can be combined with selective overcure to provide a support removal solution in which the support structure can be removed from the 3D object 1400 with a quick, simple force and that leaves external surfaces free of support marks. In one potential application of dental model production, angled supports and controlled overcure can be applied and a simple pressing of the printed model into the build platform leaves a printed model with support structures removed and with a flat bottom surface.

Figure 15A:
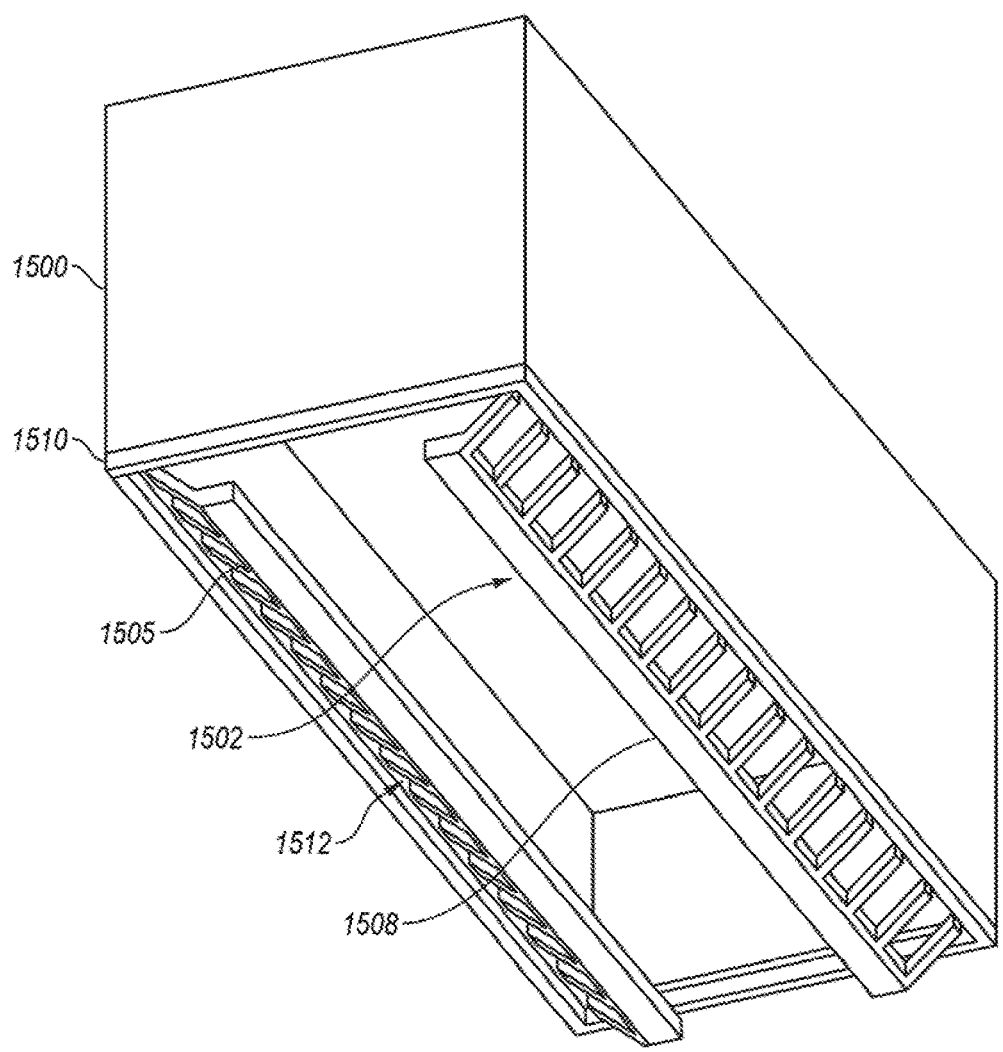
FIGS. 15A-15B show various views of one implementation of a 3D printed object with angled support structures and an overcure region.
Figure 15B:
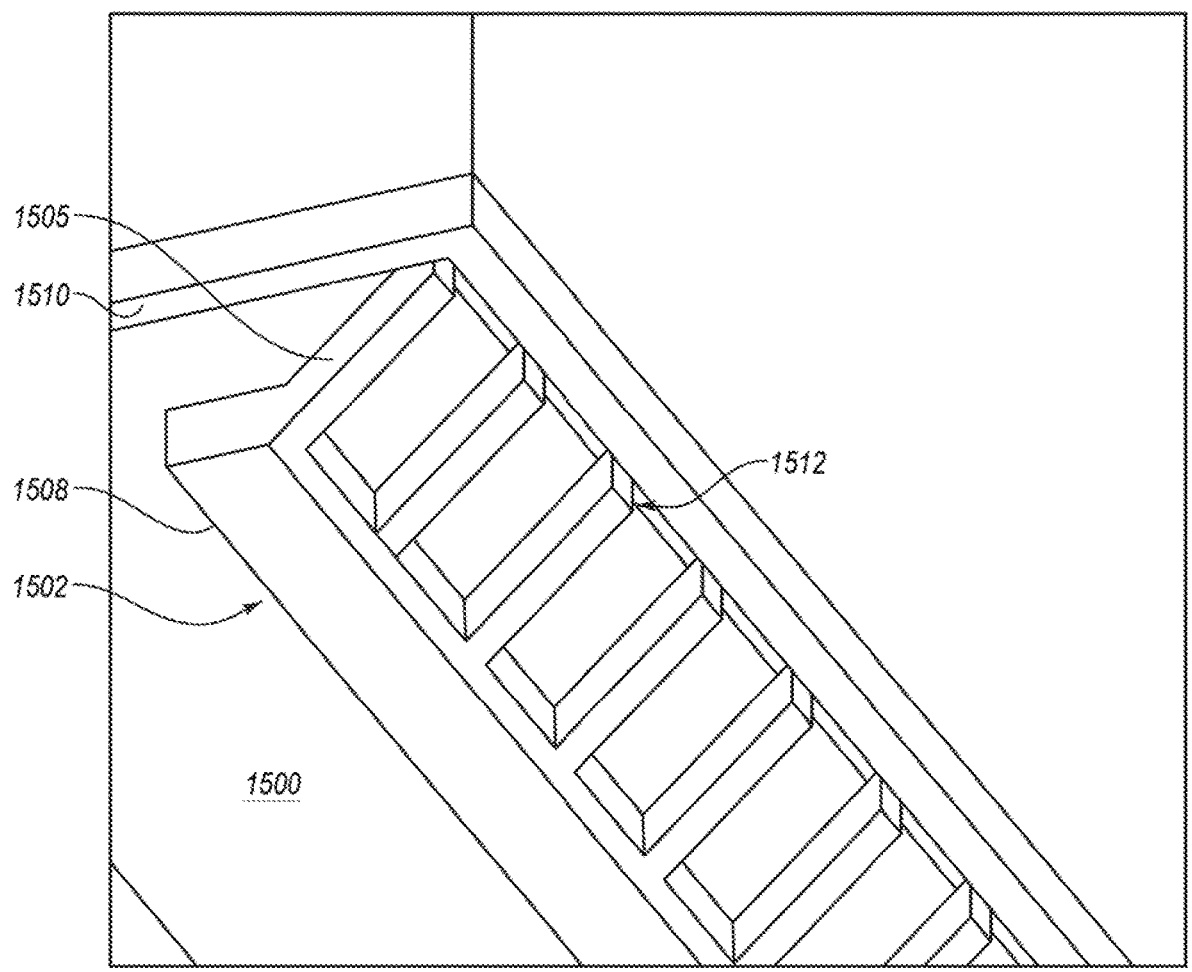

FIGS. 15A-15B show various views of one implementation of a 3D printed object 1500 with angled support structures 1502 and an overcure region 1510. FIG. 15A is a perspective view of the 3D printed object 1500. FIG. 15B is a zoomed in perspective view of the 3D printed object 1500. As shown, the support structures 1502 include a base plate 1508 and angled struts 1505 that connect to the object 1500 at a support region 1512. The 3D printed object 1500 includes the support region 1512 as well as an overcure region 1510 that extends beyond any support marks that remain after the support structure 1502 is removed from the 3D printed object 1500.

In some embodiments, the application of a controlled force could be applied to multiple printed objects simultaneously. For example, a build platform could be filled with dental molds for clear aligner forming and a controlled downward force could be applied across the entire build platform to remove support structures from the dental molds.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a component" includes a plurality of such components and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of manufacturing a three-dimensional (3D) object, comprising:
fabricating a support structure;
fabricating the 3D object on the support structure, wherein the support structure contacts the 3D object at a support region of the 3D object;
overcuring the 3D object at an overcure region of the 3D object, wherein the overcure region is distinct from the support region; and
removing the support structure from the 3D object, wherein after removal of the support structure, a support mark remains on the 3D object where the support structure had contacted the 3D object, wherein the overcure region of the 3D object projects past the support mark;
wherein the 3D object comprises a positive mold of a dental arch of a patient that is used to thermoform a removable customized dental appliance comprising a plurality of tooth receiving cavities, and wherein the overcure region provides a flat bottom surface for the positive mold of the dental arch that is operatively unaffected by the support mark.

2. The method of claim 1, wherein the support region comprises a cavity in a surface of the 3D object, wherein the support mark is within the cavity.

3. The method of claim 1, further comprising:
fabricating a plurality of support structures, wherein the support structure is one of the plurality of support structures, and wherein the 3D object is supported by the plurality of support structures during fabrication of the 3D object; and
removing the plurality of support structures from the 3D object, wherein support marks remain on the 3D object where each of the plurality of support structures had contacted the 3D object, and wherein the overcure region of the 3D object projects past the support marks.

4. The method of claim 1, wherein a bottom surface of the 3D object that comprises the overcure region is substantially flat such that a top surface of the 3D object is at a known position relative to a flat surface on which the 3D object is placed after removal of the support structure.

5. The method of claim 1, wherein a surface of the 3D object has a specified profile with specified design tolerances, and wherein the support mark does not interfere with the specified design tolerances.

6. The method of claim 1, wherein a first horizontal cross section of the support region is larger than a second horizontal cross section of the support structure to provide a separation between the support structure and the overcure region.

7. The method of claim 1, wherein the overcure region defines an outer profile of the 3D object, wherein the support mark does not extend outside of the outer profile defined by the overcure region.

8. The method of claim 7, wherein the support mark is substantially rough, and wherein the outer profile of the 3D object that corresponds to the overcure region is substantially smooth.

9. The method of claim 1, wherein the 3D object is fabricated by a rapid prototyping machine based on computer readable instructions representing a virtual 3D model of the 3D object, wherein an outermost edge of the 3D object corresponds to the overcure region and is specified in the computer readable instructions.

10. The method of claim 1, wherein one end of the support structure is attached to a build platform, wherein the support structure comprises one or more angled struts that are angled relative to gravity, and wherein the support structure is configured to break at a location that is inset from an outermost edge of the 3D object.

11. The method of claim 1, wherein the support structure and the 3D object on the support structure are fabricated using an additive manufacturing process.

12. The method of claim 11, wherein the additive manufacturing process is performed in a stepwise manner, wherein a different layer of the 3D object is fabricated at each step, and wherein the overcuring is performed at one or more predetermined layers of the overcure region.

13. The method of claim 1, further comprising performing the following after fabricating the 3D object and before removing the support structure from the 3D object:
cleaning the 3D object; and
performing post-curing of the 3D object.

14. The method of claim 1, wherein an outer profile of the 3D object defined by the overcure region is at least one of substantially level, substantially even, substantially straight or substantially curved.

15. The method of claim 1, wherein the 3D object is a multi-layer object, and wherein:
fabricating the support structure and fabricating the 3D object each comprise selectively curing a photocurable polymer at specified locations using a first exposure time and a first energy level that are selected to cure a first thickness of the photocurable polymer corresponding to a layer; and
overcuring the 3D object comprises curing the photocurable polymer at the overcure region using a second exposure time and a second energy level that are selected to cure a second thickness of the photocurable polymer that is greater than the first thickness, wherein at least one of the second exposure time is greater than the first exposure time or the second energy level is greater than the first energy level.

16. A method of manufacturing a three-dimensional (3D) object, comprising:
curing a photocurable polymer at n layers to form a support structure for the 3D object using an additive manufacturing process;
curing the photocurable polymer at layer n+1 at a support region of the 3D object, wherein at least a portion of the support region of the 3D object contacts the support structure; and
overcuring the photocurable polymer at layer n+1 at an overcure region of the 3D object that is distinct from the support region such that a bottom of the overcure region extends beyond the layer n+1;
wherein the 3D object comprises a positive mold of a dental arch of a patient that is used to thermoform a removable customized dental appliance comprising a plurality of tooth receiving cavities, and wherein the overcure region provides a flat bottom surface for the positive mold of the dental arch that is operatively unaffected by a support mark.

17. The method of claim 16, wherein the overcuring is performed such that the overcure region extends below layer n and/or below layer n−1.

18. The method of claim 16, wherein:
the curing is performed using a first exposure time and a first energy level that are selected to cure a first thickness of the photocurable polymer corresponding to a layer; and the overcuring is performed using at least one of a second exposure time or a second energy level that are selected to cure a second thickness of the photocurable polymer that is greater than the first thickness, wherein at least one of the second exposure time is greater than the first exposure time or the second energy level is greater than the first energy level.

\* \* \* \* \*